US 9,336,528 B2

(12) United States Patent
Beaton

(10) Patent No.: US 9,336,528 B2
(45) Date of Patent: May 10, 2016

(54) SYSTEM AND METHOD FOR OVERLAY ADVERTISING AND PURCHASING UTILIZING ON-LINE VIDEO OR STREAMING MEDIA

(76) Inventor: Jeffrey Beaton, Fort Collins, CO (US)

( * ) Notice: Subject to any disclaimer, the term of this patent is extended or adjusted under 35 U.S.C. 154(b) by 1838 days.

(21) Appl. No.: 12/322,644

(22) Filed: Feb. 4, 2009

(65) Prior Publication Data

US 2010/0153831 A1 Jun. 17, 2010

Related U.S. Application Data

(60) Provisional application No. 61/203,057, filed on Dec. 16, 2008.

(51) Int. Cl.
| | | |
|---|---|---|
| *G06F 17/00* | (2006.01) | |
| *G06Q 30/02* | (2012.01) | |
| *G06F 17/30* | (2006.01) | |
| *G06Q 30/06* | (2012.01) | |

(52) U.S. Cl.
CPC .......... *G06Q 30/02* (2013.01); *G06F 17/30017* (2013.01); *G06Q 30/0603* (2013.01)

(58) Field of Classification Search
CPC ................................. G06F 17/30017
USPC ................... 715/205, 234, 236, 277, 716
See application file for complete search history.

(56) References Cited

U.S. PATENT DOCUMENTS

| | | | | |
|---|---|---|---|---|
| 5,411,270 | A * | 5/1995 | Naka et al. ....................... | 463/33 |
| 6,264,555 | B1 * | 7/2001 | Glazman et al. .................. | 463/1 |
| 6,314,569 | B1 | 11/2001 | Chernock et al. | |
| 6,396,473 | B1 | 5/2002 | Callahan et al. | |
| 6,400,804 | B1 * | 6/2002 | Bilder ............................. | 379/76 |
| 6,597,857 | B1 * | 7/2003 | Clapper .......................... | 386/234 |
| 6,616,533 | B1 * | 9/2003 | Rashkovskiy .................. | 463/31 |
| 6,622,185 | B1 * | 9/2003 | Johnson et al. ................. | 710/48 |
| 6,684,250 | B2 | 1/2004 | Anderson et al. | |
| 7,017,173 | B1 * | 3/2006 | Armstrong et al. ............. | 725/87 |
| 2002/0002525 | A1 * | 1/2002 | Arai et al. ....................... | 705/37 |
| 2002/0075332 | A1 * | 6/2002 | Geilfuss et al. ................ | 345/859 |
| 2003/0037068 | A1 * | 2/2003 | Thomas et al. ................ | 707/200 |
| 2003/0130020 | A1 * | 7/2003 | Bates et al. ....................... | 463/1 |
| 2005/0060745 | A1 * | 3/2005 | Riedl et al. ....................... | 725/42 |
| 2005/0229227 | A1 * | 10/2005 | Rogers ............................ | 725/115 |
| 2006/0068861 | A1 * | 3/2006 | Triestram et al. ................. | 463/1 |
| 2007/0089150 | A1 * | 4/2007 | Bowler .......................... | 725/113 |
| 2007/0169165 | A1 * | 7/2007 | Crull et al. .................... | 725/135 |
| 2008/0109556 | A1 * | 5/2008 | Karlberg ........................ | 709/231 |
| 2008/0189408 | A1 | 8/2008 | Cancel et al. | |
| 2008/0282285 | A1 * | 11/2008 | Thomas et al. ................. | 725/32 |
| 2009/0006189 | A1 * | 1/2009 | Zhang et al. ..................... | 705/14 |
| 2009/0006211 | A1 | 1/2009 | Perry et al. | |
| 2009/0148045 | A1 * | 6/2009 | Lee et al. ....................... | 382/190 |

OTHER PUBLICATIONS

Christopher Breen, "The iPhone Pocket Guide", Sep. 20, 2007, Peachpit Press, 21 pages.*

* cited by examiner

*Primary Examiner* — Mohammed-Ibrahim Zuberi

(57) ABSTRACT

A system and method for overlay advertising and purchasing utilizing on-line and streaming media. In at least one embodiment, a viewer user receiving on-line video or streaming media is able to pause content and be directed, on the same media player, to a product panel to select product(s) to be purchased, customized, or to receive additional static or dynamic information. The method and system also provides for network connectivity to other web-based and physical services and tracking systems to determine traffic to and from the on-line video or streaming media content.

18 Claims, 27 Drawing Sheets
(17 of 27 Drawing Sheet(s) Filed in Color)

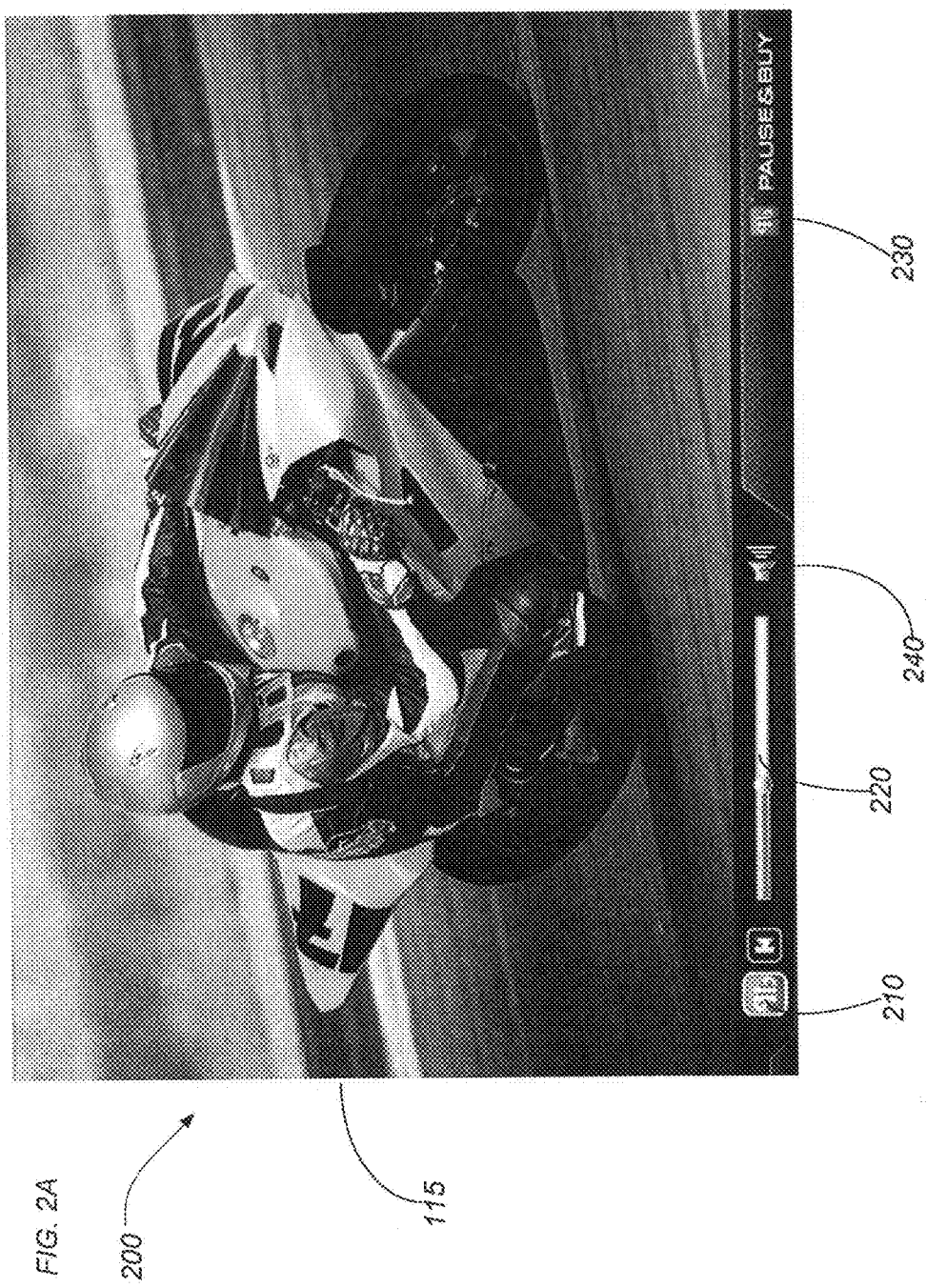

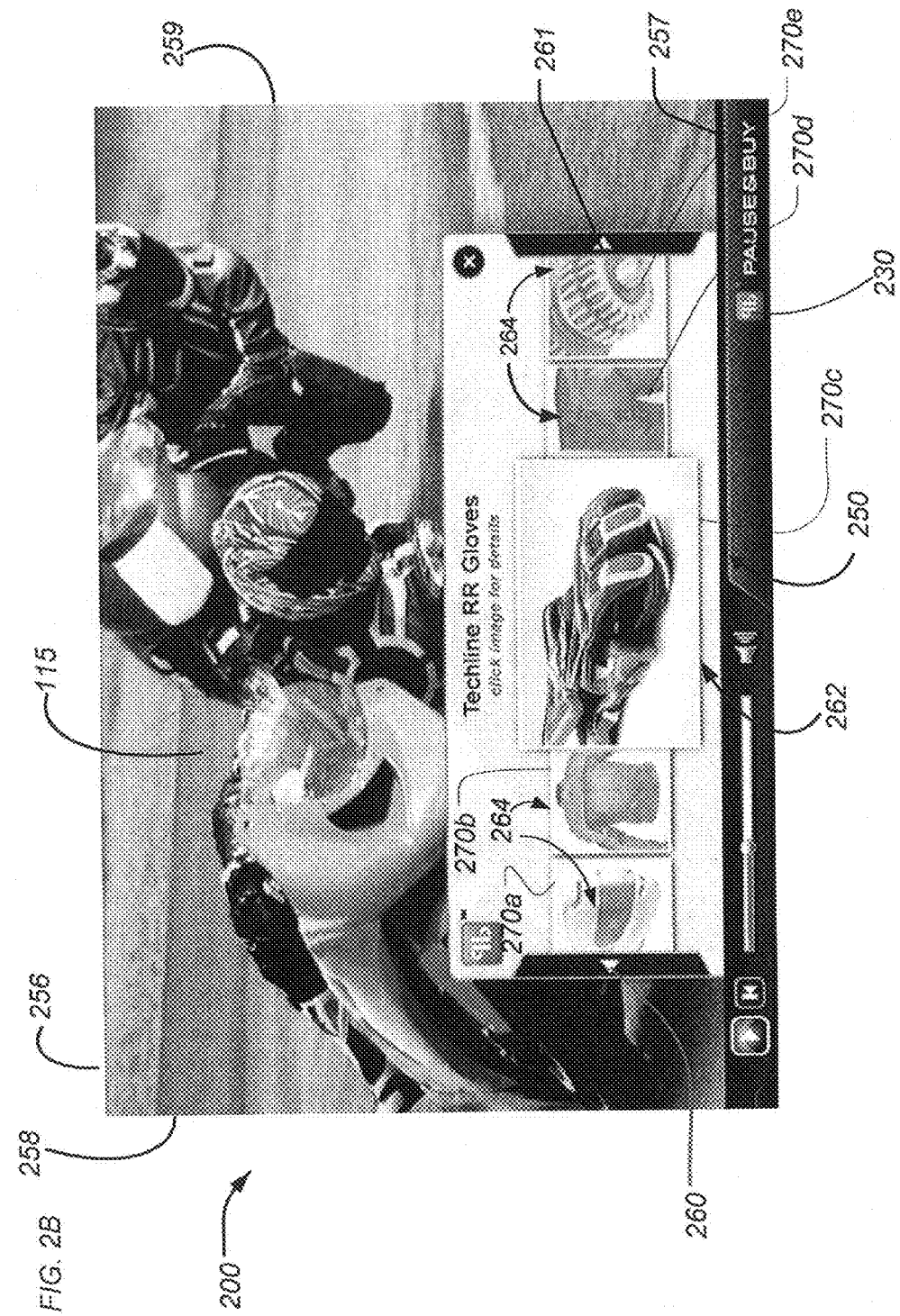

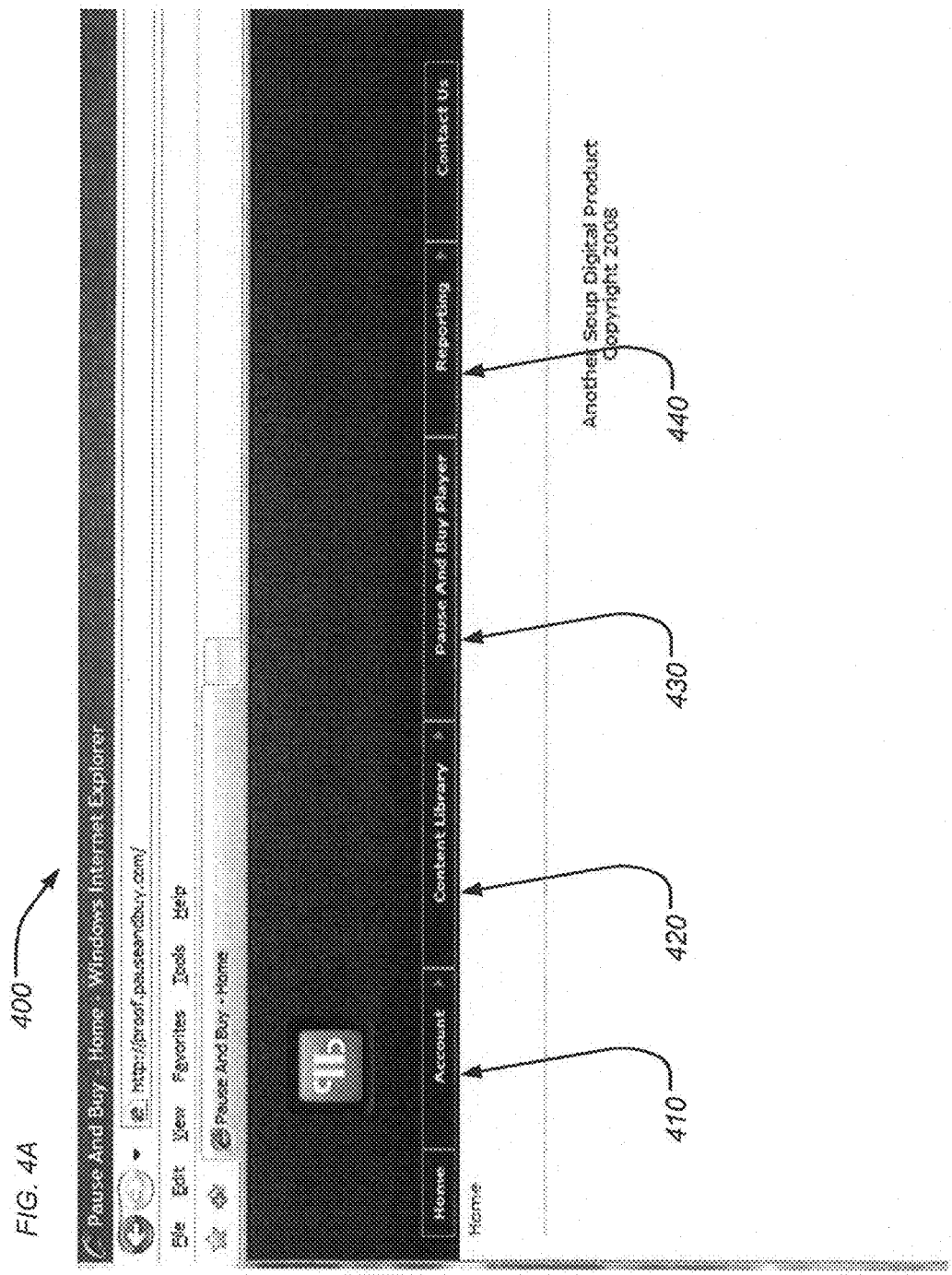

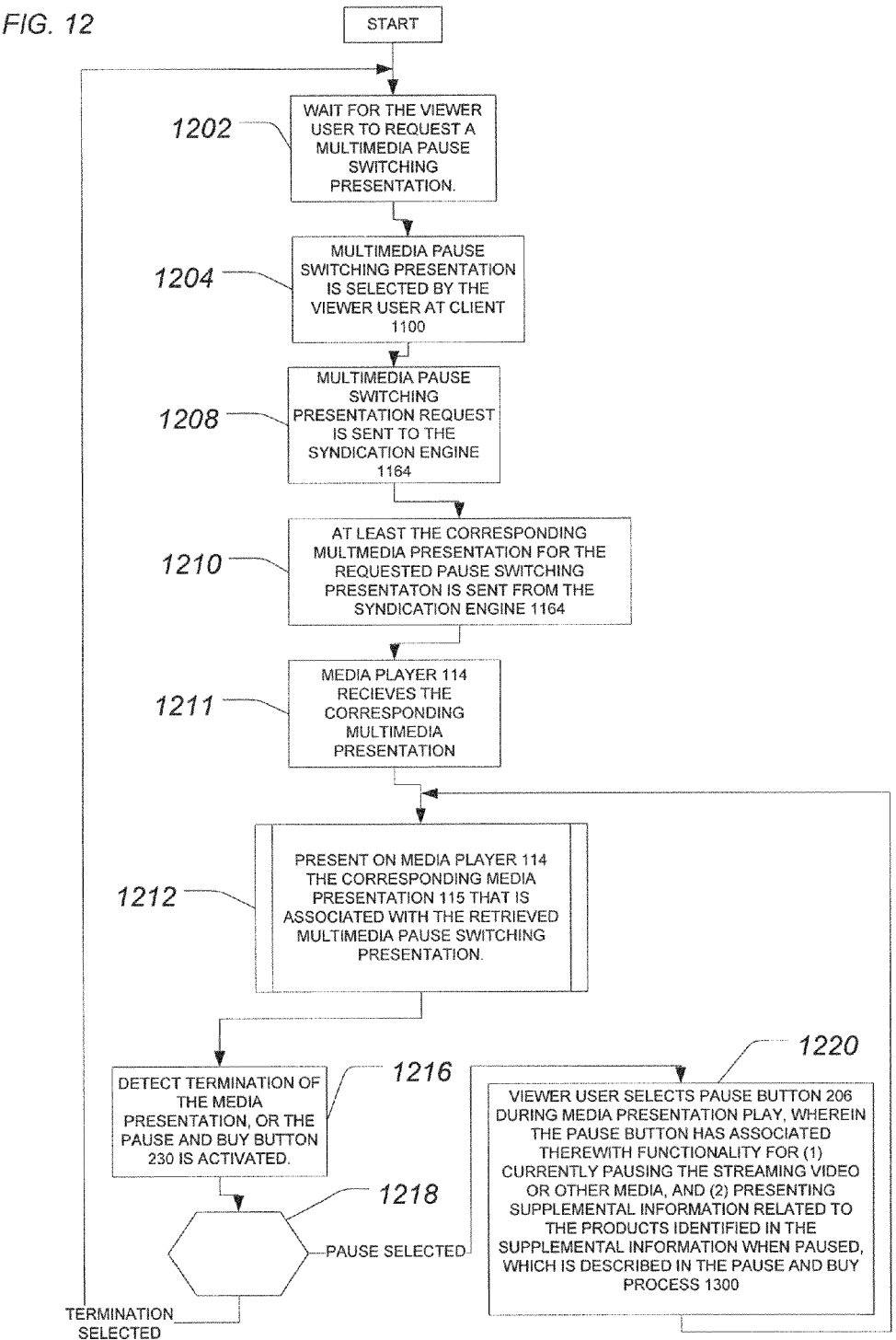

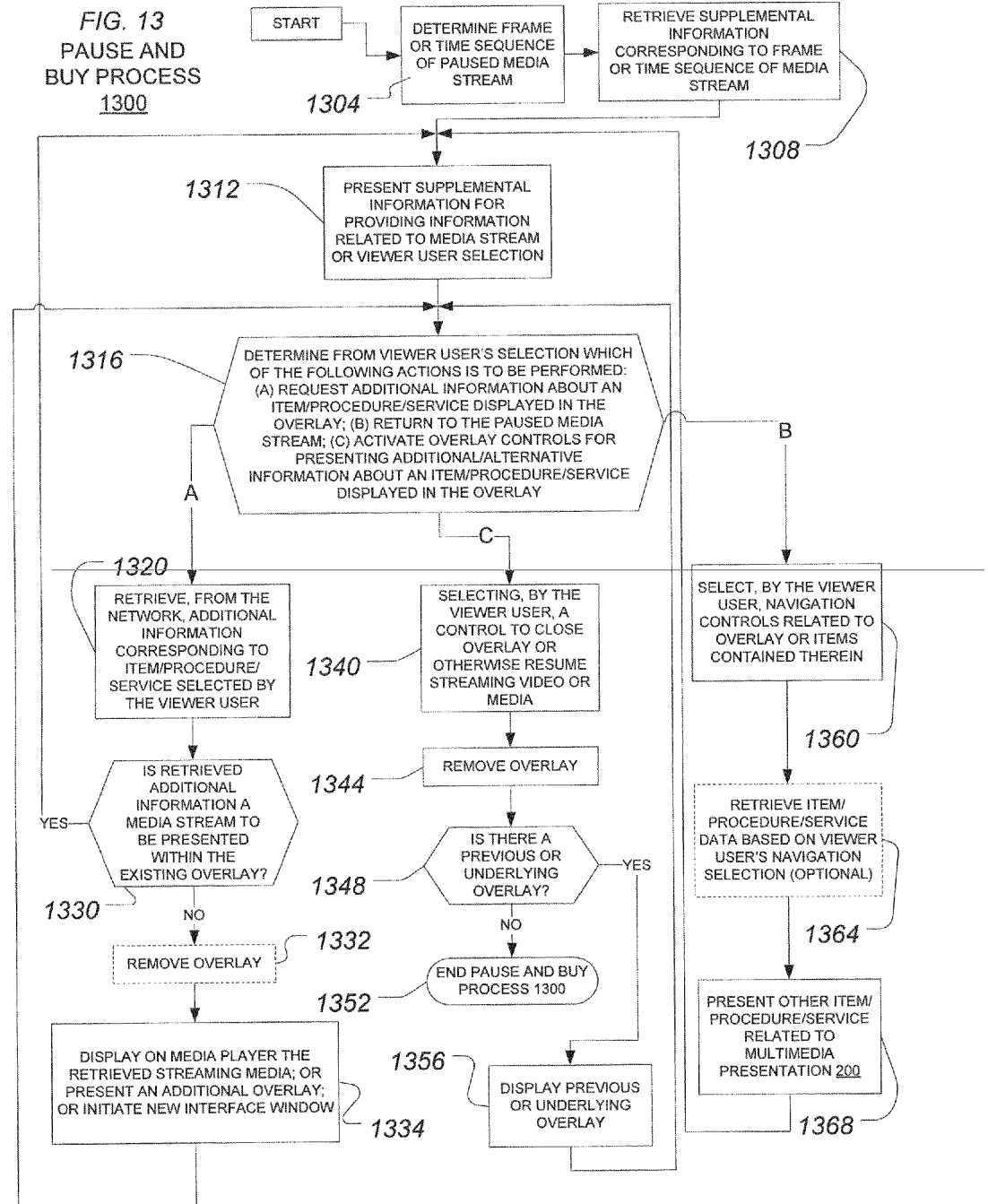

SYSTEM AND METHOD FOR OVERLAY ADVERTISING AND PURCHASING UTILIZING ON-LINE VIDEO OR STREAMING MEDIA

CROSS-REFERENCE TO RELATED APPLICATIONS

This application claims priority from U.S. Patent Application Ser. No. 61/203,057 filed on Dec. 16, 2008. The entire disclosure of the prior application is considered to be part of the present disclosure and is hereby incorporated by reference in its entirety.

RELATED FIELD OF THE INVENTION

The present invention is related to the display supplemental information upon a pause of a media presentation, and in particular, to the presentation of such supplemental information and its corresponding media presentation using network communications to control and manage such presentations. More particularly, the present disclosure relates to the field of on-line advertising, and to a system and method for using overlay advertising and purchasing utilizing on-line video or streaming media.

BACKGROUND OF THE INVENTION

Purchasing decisions are made with the consideration of various factors. Consumers use the combination of intellectual and emotional justifications to make purchasing decisions. As such, brand impact can be used to effectively leverage and persuade both intellectual and emotional justifications. The medium that currently has the greatest opportunity for delivering both intellectual and emotional persuasion through brand impact is the audience's personal screen (e.g., computer screen, mobile phone, iPod, or other personal screens). The interactivity of the personal screen allows the audience (viewer) to act on their persuasions.

On-line advertising continues to grow exponentially each year. The proliferation of computers, wireless devices, and broadband connections make on-line advertising an attractive option for businesses. One area of particular growth in on-line activity is users viewing on-line video or streaming media. The use of personal and commercial on-line video and streaming media has grown with the use of web services and portals such as YouTube™. Marketers have been trying to figure out how to take advantage of this trend. Previous methods such as pre- and post-roll video advertising, similar to television commercials, are the most common method to include advertising into on-line video or streaming media. Similarly, "pop-up", banner, and placement advertising have been used concurrently with the playing of an on-line video or streaming media. The on-line advertising industry, however, has not been able to maximize the effectiveness of product placement within on-line video or streaming media.

Prior methods of on-line advertising, as described above, generally reduce the amount of advertising "real estate" available and/or also directs the audience/viewer's attention away from the on-line video or streaming media, which is the original point of interest. Available advertising space on internet web pages is limited, thereby, reducing the potential revenue opportunities for on-line publications. Therefore, there is a need to increase advertising potential while maintaining a viewer user's attention.

DESCRIPTION OF TERMS

The descriptions in this section may be pertinent to the description of the novelty disclosed herein as well as the claims that describe the invention. Accordingly, the descriptions of this section, alone or in combination with other disclosure herein, may provide effective support and enablement of the claimed invention.

Media data: Data defining (a) a video presentation, or (b) a streamed presentation (e.g., multimedia data that is concurrently being both received at a presentation device, and presented to a user at the presentation device), and/or (c) a time sequenced presentation, wherein the data is time sequenced for generating the presentation by a single traversal of the time sequenced data.

Media presentation: An actual presentation of an instance of media data.

Supplemental information: Information associated with an instance of media data, wherein when a presentation ("multimedia presentation") of the instance of media data is paused by a user input to a device or player for presenting the presentation, a presentation for the supplemental information is presented. In one embodiment, the supplemental information may be advertising related information and the corresponding presentation therefor presenting one or more advertisements.

Multimedia Pause Switching Presentation (or data therefor): A structured ensemble of data including: (a) a corresponding media presentation (or data therefor), (b) one or more collections of supplemental information for presenting one or more supplemental presentations, (c) association data for associating the media presentation with the collections of supplemental information, wherein when the media presentation is paused, one or more of the supplemental presentations are presented, e.g., as an overlay to the media presentation. Each collection of supplemental information may include data for presenting a list or other structured display of corresponding presentations ("supplemental presentations" herein), wherein in one embodiment such supplemental presentations may be advertisements. Accordingly, the association data may include one or more data associations for associating the collections of supplemental information with particular portions of the media presentation. In particular, each data association associates at least one portion of the media presentation with a collection of one or more supplemental presentations for presenting when the media presentation is paused. Such a data association may include data identifying when and/or how a pause occurred in order to determine whether the supplemental information also identified by the data association is to be presented during the pause. For example, the data association may include data indicative of an amount of the corresponding media presentation already presented prior to the pause, or alternatively data indicative of an amount of the corresponding media presentation remaining to be presented. Alternatively/additionally, such portions of the corresponding media presentation may be identified in the data association according to a user viewer selection within a subarea of a display of the corresponding media presentation. In general, such data associations (or simply "associations" herein) associate portions of the corresponding media presentation with its supplement information (supplemental presentations) wherein each have content that relates to the other. For example, a corresponding media presentation presenting a video showing a particular brand of bicycle may have associated therewith supplemental information for presenting an advertisement for the particular brand of bicycle so that upon a pause during a portion of the media presentation showing the particular brand of bicycle, the supplemental presentation of the bicycle advertisement is shown. Note that the supplemental presentation may be a typical Internet display page including hyperlinks for providing further additional information, or may be a video or streaming multimedia presentation.

Multimedia player (equivalently, media player): A device or player for presenting media data as a video, movie, or a time sequenced presentation, wherein the media data therefor is time sequenced for generating the presentation by a single traversal of the time sequenced data. Embodiments of multimedia players may be the Adobe Flash Player®, and the Microsoft SilverLight Player®. In the disclosure hereinbelow, a multimedia player is provided that has enhanced functionality, wherein a media presentation pause function is combined, in the multimedia player, with a function for presenting supplemental information associated with the media presentation (more precisely, associated with the media data for the media presentation). In particular, the supplemental information may provide advertising for a product or service also disclosed or identified in the media presentation. Accordingly, this multimedia player manages two distinct presentation data collections (i.e., an instance of media data, and it corresponding supplemental information) for presenting a media presentation until a user provides input to pause the media presentation, then, during the pause, presenting a presentation of the supplemental information, and when the pause terminates (e.g., via a user input), the media presentation continues from a point relative to the point the media presentation was paused. Additionally, when the pause terminates, the presentation of the supplemental information terminates or changes state. Various embodiments of such a multimedia player may be provided wherein the user interface techniques for activating the pause may be provided as described hereinbelow.

Pause: As used in this specification and in the claims, "pause" is meant to mean a cessation of presenting a time sequenced media, wherein status data of the media is available for continuing the presentation of the media.

Continuation (After Pause): A continuation of a media presentation after a pause has occurred. In one embodiment, the continuation is from substantially (or identically) the same place in the time sequence for the media presentation that the pause occurred. Note in general, the continuation of the media presentation will be at a same time in the time sequence that the cessation of the presentation occurred. However, it is within the same scope of the present disclosure that the status data may be used to continue the presentation of a point in the time sequence for the media that is dependent on, but not necessarily identical to, the cessation time in the time sequence. For example when the media includes a streaming video, the continuation of a corresponding presentation may be at a point in the media time sequence somewhere earlier than the point of the pause (e.g., if the pause occurred in a particular portion of the presentation where objects are moving fast enough to be blurred, the continuation point may be from a point earlier in the video than the pause where, e.g., such objects are moving slower (e.g., not blurred). More generally, the continuation after the pause may be at a point in the media presentation that is dependent upon both the point in the media presentation where the pause occurred, and the content of the media presentation at the point of the pause.

SUMMARY

A system and method is provided for presenting one or more multimedia pause switching presentations as this term is described in the Description Of Terms section hereinabove. Accordingly, during a presentation of a multimedia pause switching presentation, the corresponding "supplemental information" (e.g. advertising) can be presented to a user in conjunction with providing the corresponding "media presentation" of the pause switching presentation as these terms are described in the Description Of Terms section above, wherein, e.g., a content of the supplemental information may be related to the content of the media presentation. In particular, a presentation of the supplemental information (e.g., advertising) may identify a product or service also identified or presented in the media presentation of the pause switching presentation. Moreover, and importantly, the supplemental information may be presented as a supplemental presentation when the media presentation is paused by the user. Furthermore, as described in the Description Of Terms section above, the user can request the media presentation to continue after the pause, e.g., from the same point in the media presentation where it was paused, or, more generally, from a point in the media presentation related to the point where the media presentation was paused. Accordingly, in one embodiment, after the pause of the media presentation, one or more advertising presentations (more generally, supplemental presentations) may be overlaid, or otherwise replace, at least a portion of the media presentation, and such advertising presentations may be presented (and able to accept user input), e.g., until the user provides input for requesting the corresponding media presentation to continue. Thus, the present system and method provides a novel technique for presenting to a user, e.g., a (multi)media presentation having one or more products or services disclosed therein, and immediately upon pausing the (multi)media presentation, presenting supplemental information for, e.g., (a) purchasing such products or services is presented to the user, or (b) providing the user with more in depth information about a topic (e.g., a particular political issue/candidate, a classroom topic, e.g., natural history or mathematics), or article described in the (multi)media presentation.

Accordingly, the present system and method (also referred to herein as a "pause and buy system") is useful for network advertising such as on-line Internet advertising.

In one embodiment of the present pause and buy system, the following steps are performed:
(a) accessing a multimedia player distribution network server through a user network node;
(b) transmitting from the network service, a multimedia player (more generally, a "presentation display component") to the user network node, wherein the multimedia player is installed on the user node;
(c) distributing from a network server an on-line multimedia pause switching presentation to the user node;
(d) presenting the multimedia pause switching presentation with the multimedia player installed on the user node;
(e) receiving user input to the multimedia player for pausing the corresponding media presentation of the multimedia pause switching presentation;
(f) causing a graphical overlay to appear over at least a portion of the media presentation, wherein the graphical overlay provides supplemental information related to the content of the media presentation, and wherein hyperlinks are provided for the overlay so that the user can request further information related to the information provided in the overlay;
(g) presenting hyperlinked information in the graphical overlay when the user activates one of the hyperlinks; and (h) upon receipt of a user input to continue the corresponding media presentation of the multimedia pause switching presentation, the multimedia player continues playing the media presentation from the same point in the presentation where it was paused, or, more generally, from a point in the media presentation related to the point where the media presentation was paused, e.g., from a point earlier in the media presentation that is related to the point of the pause.

Accordingly, one or more systems and/or methods for overlaying advertising and purchasing products or service using on-line video or streaming media are described in the embodiments described herein. Moreover, the multimedia player distributed to a user's node (e.g., a computer for accessing the Internet, or another communication device such as a mobile phone or an Apple iTouch®) for presenting multimedia pause switching presentations may be such that this multimedia player accesses or receives the corresponding media presentation (e.g., on-line video or streaming media) provided by: (i) one or more merchant servers for advertising their products or services, or (ii) network servers for caching and presenting large numbers of multimedia presentations such as net servers of YouTube®.

In one embodiment of the pause and buy system, the user can temporarily halt (i.e., pause) the media presentation of a pause switching presentation by clicking on, e.g., an icon of a graphical user interface (GUI) associated with an appropriate multimedia player (such as a multimedia player based on Adobe Flash or Microsoft SilverLight). In particular, while watching and/or listening to the media presentation, a pause icon may be activated for pausing the media presentation and presenting the associated advertising as a supplemental presentation. Accordingly, when the media presentation is paused, the user may make a selection from, e.g., one or more images (thumbnails or larger in size) or icons of the supplemental presentation that appear superimposed over the paused media presentation. The user may then click on (e.g., activate a hyperlink for) one of these images, or icons presented in the overlay for:

(a) expanding the size (or contents) of one of the image or icon, and/or
  (b) configuring the resulting presentation of the supplemental presentation so that it can accept user input such as activation of hyperlinks or user input for filling out a form, and/or
  (c) receiving another web page (such as the web page of a merchant for a product or service) having additional information of, e.g., a product or service featured in the media presentation. This additional information can be provided within the overlay, or within a new Internet browser window, or a new browser tab.

Regardless of the particular technique for presenting the supplemental information, the user has access to a control (or user interaction technique) for continuing the media presentation from a point related to the point where the media presentation was paused. Moreover, in at least some embodiments of the pause and buy system, the user (also referred to herein as a "viewer user" for thereby distinguishing this user from other system users whose roles are different from those of a viewer user) may also be able to request customized options for the product(s) or service(s) selected as well as proceed to an e-commerce engine providing network commerce transaction features such as a purchasing shopping cart, a check-out process for completing a transaction, and a process for identifying shipping options.

In another aspect of the present disclosure, a merchant may be responsible for the content of a multimedia pause switching presentation. In particular, such a merchant may be responsible for both the corresponding media presentation of the multimedia pause switching presentation (e.g., for identifying the merchant's products or services), as well as, the corresponding supplemental (merchant advertising) information that can be presented when the media presentation is paused. In particular, such a merchant may modify the contents of (or entirely replace) the media data defining the media presentation, wherein such media data may be stored on a network server(s) of the merchant prior to being transmitted to one or more user nodes. Additionally and advantageously, the supplemental information (e.g., advertising information) associated with the corresponding media presentation may also be modified or entirely replaced independently of the media presentation to which it is associated. Accordingly, advertising supplemental information and/or the corresponding media presentation may be changed to better target a particular population of consumers. Thus, the merchant may provide different supplemental advertisements for the products or services presented in the media presentation. The merchant may also include different options for the viewer user to select in the overlay (or another user interface technique) the products or services shown. For example, such options may include controls for how long information for the product(s) or service(s) will appear in the overlay, controls for purchasing the products or services presented, and/or controls for obtaining further product or service review information.

In accordance with another aspect of the present disclosure, a method is provided by the pause and buy system disclosed herein for collecting network traffic information regarding requests for downloading a multimedia pause switching presentation(s), and/or activating a multimedia pause switching presentation, and/or pausing the corresponding media presentation for presenting a corresponding its supplemental presentation. The method provides for collecting, among other things, information related to the popularity of a featured product or service shown in the overlay (or other technique for presenting the supplemental information as discussed above), the number of times the corresponding media presentation of a multimedia pause switching presentation has been played, which product(s) or service(s) are selected in comparison to others that are presented in the supplemental presentation(s), how the viewer user(s) searched for additional information, on-line network traffic, and purchasing information, including, whether the viewer user purchased a featured product or service or returned to the corresponding media presentation without purchasing.

Embodiments of the pause and buy system can be implemented as a plurality software/hardware computational components distributed on a communications network such as the Internet. In particular, in one embodiment of the pause and buy system, this system may include the following components:

(a) Software implementing an enhanced multimedia player that is capable of presenting one or more multimedia pause switching presentations, wherein the corresponding media presentations for such a pause switching presentation can be paused for presenting associated supplemental information of the pause switching presentation. In operation, the software for the enhanced multimedia player may be downloaded to and installed on a plurality of network client nodes thereby providing viewer users having access to these nodes with the ability to play the multimedia pause switching presentations.

(b) At least one data source or repository for obtaining, storing and managing the data defining each of the one or more of the multimedia pause switching presentations, such source or repository may be in communication via a communications network with each network client node upon which the multimedia player of (a) immediately above is installed so that the pause switching presentations can be provided to the enhanced multimedia players at the network client nodes. Each such data source or repository may include a database management system for providing access to the multimedia pause switching presentations stored therein as one skilled in the art will understand.

(c) One or more hardware/software management subsystems that can be used to:

(i) Generate the one or more multimedia pause switching presentations from corresponding media presentations (e.g., streaming video data, etc.), and supplemental information (e.g., static presentations with hyperlink therein, or additional video presentations).

(ii) Provide viewer users with access to the enhanced multimedia player for installing on their computers (e.g., their network nodes).

(iii) Provide the viewer users and/or their enhanced multimedia players with information for accessing the at least one source or repository of data defining the multimedia pause switching presentations, and (iv) Receive and process communications identifying viewer user inputs: (1) for pausing media presentations of pause switching presentations, (2) for interacting with corresponding supplemental presentations during the paused media presentations, wherein such communications are processed, e.g., by analyzing the effectiveness of various multimedia pause switching presentations in selling products for a merchant whose products are identified in the supplemental presentations of the pause switching presentation.

Note that these one or more hardware/software management subsystems preferably reside at one or more servers on a network such as the Internet, wherein these servers communicate via the network with the user viewer client nodes, and the at least source or repository.

Each client node and management subsystem identified above can be, for example, a personal computer, notebook computer, server computer, mainframe, handheld computer, personal digital assistant, workstation, mobile telephone and the like. Each computing device disclosed herein generally includes a central processing unit, an output device (e.g., a display), and an operator input device. In one embodiment, each such computing device includes a processor coupled to a bus and memory storage coupled to the bus. The memory storage can be volatile or non-volatile, and can include removable storage media. Each such computing device also includes provisions for data input (e.g., touch screen, mouse, keyboard, eye tracking systems, voice recognition, pressure pads, and other human interface devices), and output (e.g., a display, printer, etc.).

In one embodiment, downloads and/or activations of pause switching presentations by viewer users are recorded at a pause switching presentation serving network (web) site or another network site for collecting data regarding: (i) the downloading and/or the viewing of such pause switching presentations, and/or (ii) the determining the efficacy and/or popularity thereof, e.g., via statistical analysis of the demographics or profiles of viewer user populations performing such downloads and/or activations. Moreover, upon a pause of the media presentation corresponding to a multimedia pause switching presentation (e.g., via a particular viewer user interaction such as a click on the active corresponding media presentation, or selection of a pause control button, or the like), a series of supplemental informational frames may be presented to the viewer user, wherein such frames may automatically scroll horizontally or vertically on the viewer user's display thereby presenting, e.g., advertising, instructional, and/or educational information that may be related to the contents of the corresponding media presentation. In particular, the presentation of such supplemental information may overlay a video of the corresponding media presentation when this presentation is paused. Additionally, the presentation of such supplemental information may be recorded at a pause switching presentation serving network (web) site or another network site for collecting data regarding the presenting of the supplemental information, and optionally determining the efficacy and/or popularity thereof, e.g., via statistical analysis of the demographics or profiles of viewer user populations viewing the supplemental information. Furthermore, since a viewer user may select such supplemental information frames for expanding and thereby obtaining a better view of the contents thereof, upon such selection, additional network transmissions may be provided to, e.g., a pause switching presentation serving network (web) site or another network site for collecting data regarding the viewing of such expanded supplemental information, and optionally determining the efficacy and/or popularity thereof, e.g., via statistical analysis of the demographics or profiles of viewer user populations viewing of such expanded supplemental information. Note that the above mentioned statistical analyses may be performed via statistical regression techniques, and/or may use various techniques disclosed in U.S. Patent Application Publication No. 2008/0189408, by Cancel et. al. published Aug. 7, 2008 which is fully incorporated herein by reference. Moreover, such analysis techniques may be used to compare the effectiveness of various advertisements (or advertising campaigns): (i) within the same multimedia pause switching presentation (e.g., compare an effectiveness for advertising viewer user interactions between different ads within the same pause switching presentation), and/or (ii) between such pause switching presentations (e.g., compare an effectiveness for advertising viewer user interactions for the same or different ads between the pause switching presentations having different corresponding media presentations). In one embodiment, such analysis (or other advertising selection techniques) may be used to push additional advertising to viewer users, e.g., such additional advertising may be presented according to (the types of) advertising presented when a pause switching presentation is paused, and/or according to (the types of) corresponding media presentations that the viewer users view. Further note that the data collected regarding viewer users interactions related to such pause switching presentations may include viewer user identification, times/dates of such interactions, an approximate geographical location of the user (e.g., via the technology disclosed in U.S. Pat. No. 6,684,250 fully incorporated herein by reference), as well as the type of such interactions.

Some portions of the disclosure herein are presented in terms of procedures, steps, processing, and other symbolic representations of operations on data bits that can be performed on a computer memory. These descriptions and representations are the tools used by those skilled in the data processing arts to convey the substance of their work to others. Accordingly, a procedure, computer executed step, logical operations, process, etc., is generally a sequence of operations or instructions leading to a desired result. In addition, procedures, steps, operations, and processes of the present disclosure are implemented as a sequence of steps running or implemented on a computing system, and interconnected to other machine or hardware units internal or external to the computer system. The implementation of the sequence of steps is dependent on the performance requirements of the computing system implementing the various portions of the present disclosure. The operations are those requiring physical manipulations of physical quantities. Usually, although not necessarily, these quantities take the form of electrical or electromagnetic signals capable of being stored, transferred, combined, compared, and otherwise manipulated in a computer system. It has proven convenient at times, principally for reasons of common usage, to refer to these signals as bits, values, elements, symbols, characters, terms, numbers or the like. It should be kept in mind, however, that all of these terms, and similar terms, are to be associated with the appropriate physical quantities and are merely convenient labels applied to these quantities. Unless specifically stated otherwise, or as apparent from the disclosure herein, it should be appreciated that throughout the present disclosure, descriptions utilizing terms such as "accessing," "determining," "providing," "receiving," or the like generally refer to the actions and/or processes of a computer system, or similar electronic computing device, including an embedded system, that manipulates and transfers data represented as physical (electronic) quantities within the computer system's registers and memories into other data similarly represented as physical quantities within the computer system memories or registers or other such information storage, transmission or display devices.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Various embodiments of the present disclosure are set forth in the attached figures and in the Detailed Description as provided herein and as embodied by the claims. It should be understood, however, that this Summary does not contain all of the aspects and embodiments of the one or more inventions disclosed herein, is not meant to be limiting or restrictive in any manner, and that the invention(s) as disclosed herein is/are to be understood to encompass obvious improvements and modifications thereto as may be provided by those having ordinary skill in the art.

Additional advantages of the present disclosure will become readily apparent from the following discussion, particularly when taken together with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

To further clarify the above and other advantages and features of the present disclosure, it is appreciated that the accompanying drawings depict only typical embodiments of the disclosure and are therefore not to be considered limiting of its scope. The disclosure will be described and explained with additional specificity and detail through the use of the accompanying drawings in which:

FIGS. 2A-2C are pictorial representations of a graphical user interface depicting an embodiment of present disclosure.

FIGS. 4A-4H illustrates one embodiment of the multimedia player server interface.

FIG. 12 provides a flowchart for an embodiment of the pause and buy system.

FIG. 13. provides a more detailed flowchart for the process of one of the steps of FIG. 12.

DETAILED DESCRIPTION OF THE INVENTION

A system and method (referred to as a "pause and buy system" herein) for overlaying supplemental presentations (e.g., advertising for purchasing products or services) when a corresponding media presentation is paused is described herein. Such a system and method for overlaying such supplemental information can be used in a wide range of communications and corresponding devices, including, but not limited to, over-the-air television transmissions, Internet communications, cable network communications, mobile device communications (such as occur via smartphones and mobile telephones), audio only devices (wherein the media presentation of a pause switching presentation may be audio only), and others. While the present disclosure provides several embodiments of the pause and buy system, individuals skilled in the art will understand that the embodiments herein are not intended to limit the disclosure to only these embodiments. The present disclosure is intended to cover alternatives, modifications and equivalents which may be included within the spirit and scope of the disclosure as defined by claims below.

Embodiments of the pause and buy system described herein may be provided on various types of computer or communications networks such as: a client-server network, including local area networks ("LAN"), wide area networks ("WAN"), the Internet, and other computer networks that distribute processing and/or share data among a plurality of nodes, "cloud" computing, or peer-to-peer networks capable of distributing information and needed services. Such a computer or communications network may provide, among other things, access and functionality to services such as, electronic mail ("email"), file transfer protocol ("FTP"), hypertext transfer protocol ("HTTP") and access to the World Wide Web ("WWW"). In one embodiment of the disclosure, WWW browsing software, commonly known as a "web browser" (e.g., Mosaic, Internet Explorer, Safari, Chrome, FireFox, etc.) provides for access to Internet information and services provided and/or distributed by other computers or computer systems. Such browsers allow for the handling, locating, displaying, targeting, and/or finding information provided by computers and/or servers connected to the WWW. By selecting a hypertext link or object connected to a hypertext link, a viewer user can view distributed software, documents, or other server content, such as on-line video or streaming media. At least one embodiment of the pause and buy system utilizes an operating environment comprised of distributed computing systems, e.g., computers that are connected through multiple types of communication links.

Figure 1:
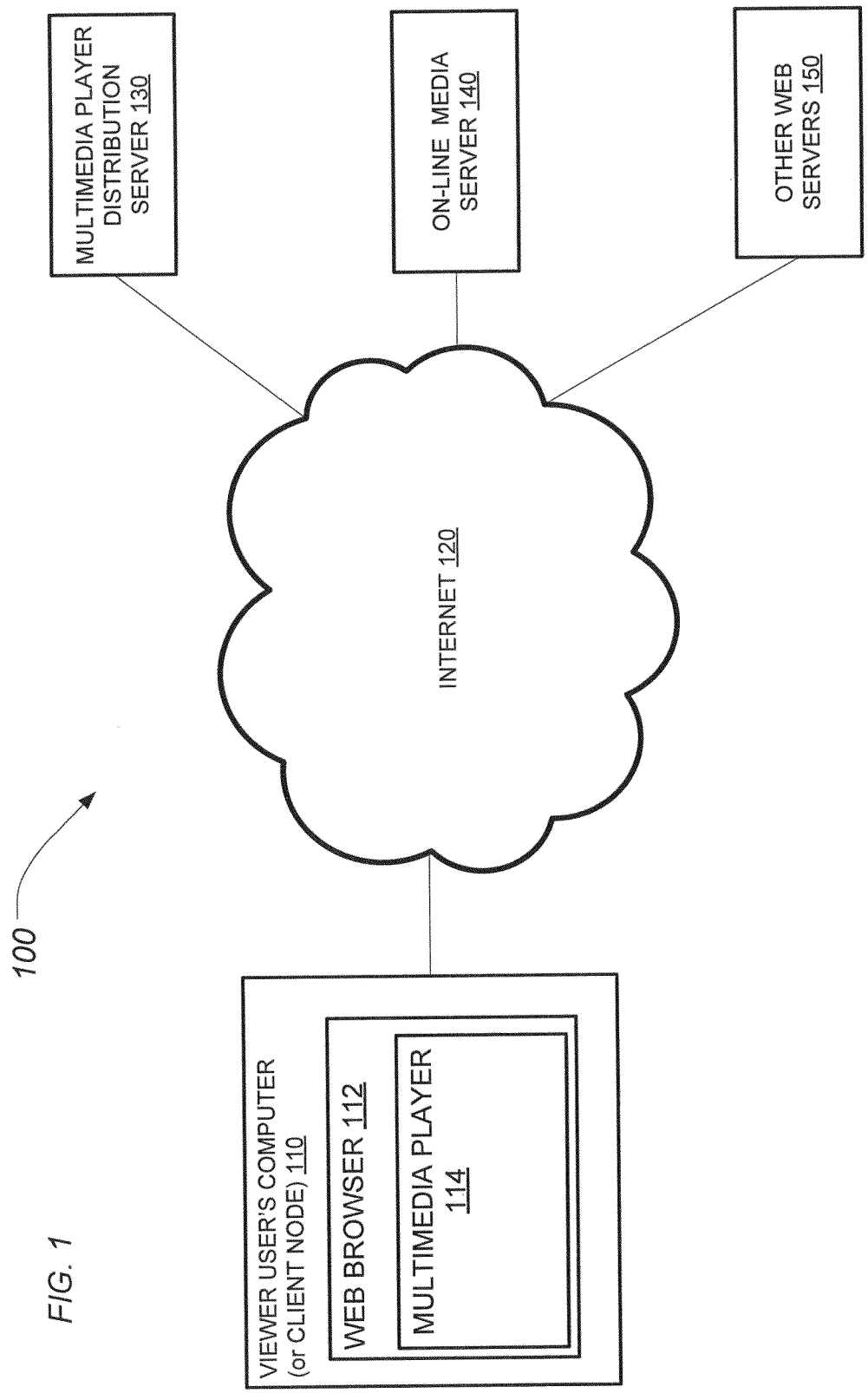
FIG. 1 is a pictorial representation of one embodiment of the computer network accessed by a viewer user.
Figure 11:
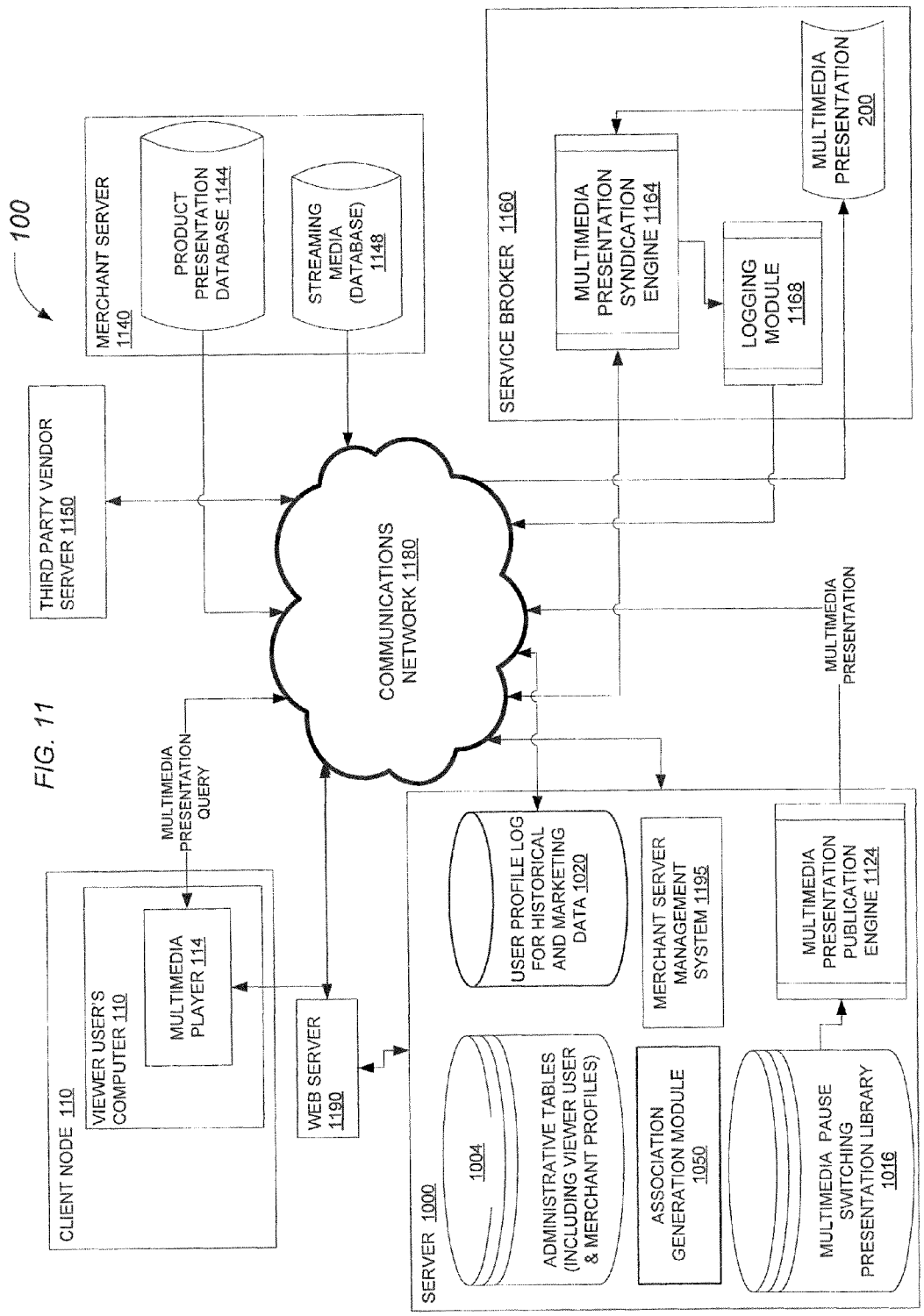
FIG. 11 illustrates one embodiment of the interactions between and among a client, a server, a service broker, a vendor server and a third party vendor server.

With reference now to FIG. 1, an illustration is provided of one architecture of a computer network 100 in one embodiment of the pause and buy system (note, a more detailed alternative embodiment is shown in FIG. 11 described further hereinbelow). A viewer user's computer or client node 110 accesses the Internet 120 through a web browser 112. Through the web browser 112, the viewer user browses for content of interest, and views such content stored on, and distributed by, at least one computer or web server. Of the content that is distributed to the viewer user's web browser 112, the viewer user may further select a hyperlink for receiving additional content.

The viewer user selects the on-line video or streaming media of interest by selecting the hyperlink to such multimedia content. As one having ordinary skill in the art will appreciate, the user's computer or client 110 may require installation of an appropriate media player to perform the functionality disclosed herein, and in particular, for presenting multimedia pause switching presentations. In one embodiment, such an appropriate media player may be acquired by the viewer user's web browser 112 sending a request to the multimedia player distribution server 130 (FIG. 1) for a download and installation of a multimedia player 114 (FIG. 1), whereupon the multimedia player distribution server 130 responds to the request by distributing an enhanced multimedia player, in accordance with the pause and buy system of the present disclosure, to the computer or client 110 via the Internet 120. One having ordinary skill in the art will understand how a viewer user performs a method by which such an enhanced multimedia player (identified as a multimedia player 114 in FIG. 1, and hereinbelow) is downloaded and installed on the computer 110. After the multimedia player 114 is installed, one or more multimedia pause switching presentations may be also transmitted to the computer 110, e.g., by an on-line media server 140, and more particularly to the viewer user's web browser 112 for presentation by the multimedia player 114. Other web servers 150 may distribute other information to the web browser, and the multimedia player 114 as well.

One skilled in the art will understand that the various methods by which the multimedia player 114 may be distributed to the viewer user's computer 110. These methods include, for example, distribution of the software by magnetic or optical media, or downloading or receiving the software through HTTP, FTP, or email services. In another embodiment, the software may come pre-installed on the computer 110, PDA, phone, or other device.

In yet another embodiment of the present disclosure, the multimedia player 114 may be installed on a remote application server, wherein the viewer user invokes, through the client web browser 112, remote calls on the application server. In this embodiment, the viewer user accesses the multimedia player 114 through a view/portal in the web browser 112 to the application server. In this configuration, the multimedia player 114 functionality is available via the viewer user's web browser 112, without having to install multimedia player 114 on the client device.

"Pause & Buy"

As disclosed above, the viewer user uses an interactive graphical interface enabled by a web browser 112 to access an Internet website (e.g., media server 140 or other servers 150) of interest containing hyperlinks to a multimedia pause switching presentation(s). The viewer user selects each multimedia pause switching presentation to view. Upon selection of the multimedia pause switching presentation(s) (e.g., by selecting a hyperlink to such presentations), a request is sent to the on-line media server 140 for the selected multimedia pause switching presentation(s), and the requested data for the multimedia pause switching presentation(s) is downloaded to the computer 110.

Figure 2C:
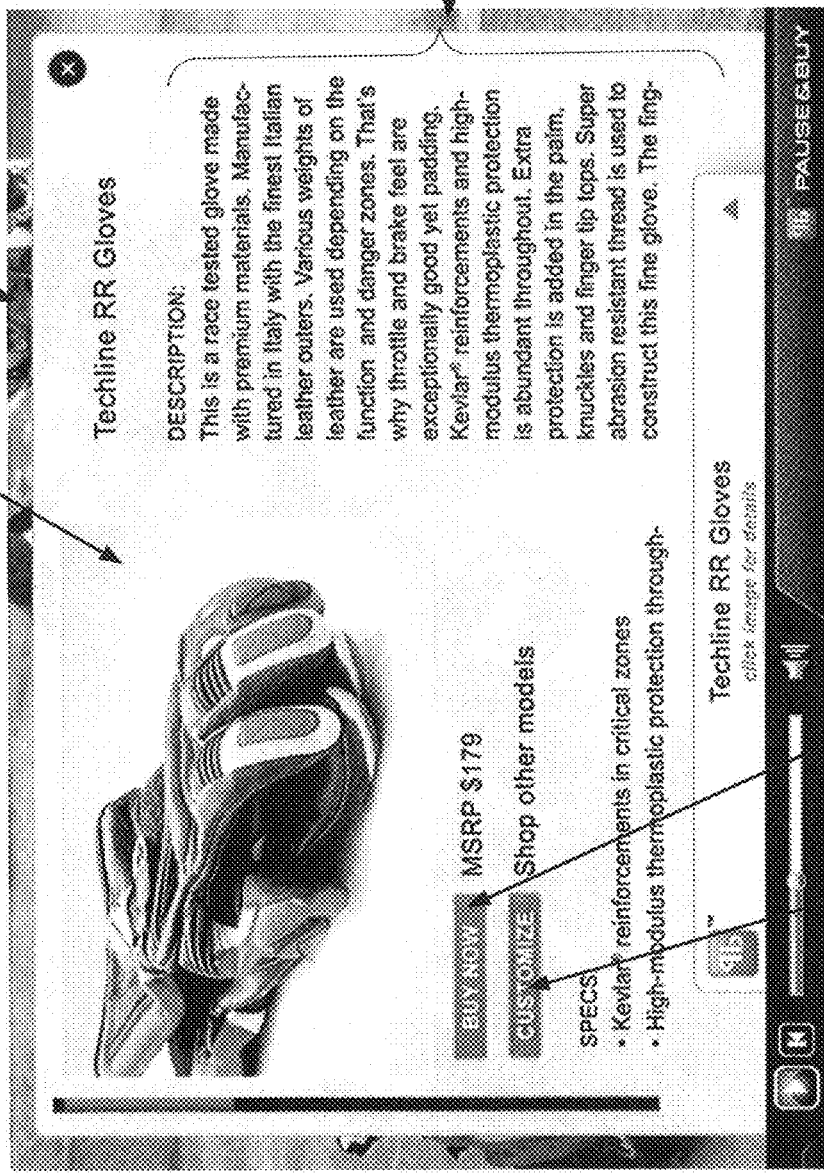

Referring to FIGS. 2A-2C, various displays from a multimedia pause switching presentation (this term being described in the Description of Terms section hereinabove) are shown. Upon the viewer user's request to view the corresponding media presentation (e.g., an on-line video or streaming multimedia content) of the multimedia pause switching presentation, data for this multimedia pause switching presentation is distributed to the viewer user's interactive graphical interface (e.g., provided by the web browser 112, FIGS. 1 and 11), and more particularly to the multimedia player 114 (FIGS. 1 and 11), by the on-line media server(s) 140 (FIG. 1) or, e.g., server 1140 (FIG. 11). The data for the multimedia pause switching presentation may be provided to the viewer user via a network (Internet) transmission. Each resulting multimedia pause switching presentation (and the transmitted data therefor) includes one or more data associations for associating supplemental information (this term being described in the Description of Terms section hereinabove) with the corresponding media presentation (labeled 115 in the figures) for the pause switching presentation. Accordingly, when this media presentation is paused, at least a portion of the corresponding supplemental information is presented as one or more advertising displays 270 (referred to herein as "supplemental presentations" or "product presentations"). In particular, when the multimedia player 114 button 230 (FIG. 2A), or other user interaction technique providing similar functionality, is activated for pausing the media presentation 115, such supplemental information is presented, wherein this supplemental information may be, e.g., advertising information for providing further information about products or services presented in the media presentation 115.

The determination of which portions of the corresponding supplemental information to present upon any given pause of the media presentation 115 may be determined using association data (or simply "association" herein) for the pause switching presentation. Note that the association between the media presentation 115 and the corresponding associated supplemental information may be as simple as associating a collection of one or more supplemental presentations 270 with the corresponding media presentation 115, wherein this collection is displayed each time the media presentation 115 is paused. However, more complex associations may also be included in a multimedia pause switching presentation. For example, a plurality of collections of one or more supplemental presentations 270 may be associated with the media presentation 115 of the pause switching presentation (or the data therefor), wherein different collections from the plurality of collections are presented dependent upon when and/or how the media presentation 115 is paused. More specifically, a first association may be used to present a first collection when a pause occurs in an initial predetermined portion of the media presentation 115, and a second association may be used to present a second collection (different from the first collection) of one or more supplemental presentations in a subsequent second portion of the media presentation 115. Accordingly, different associations may be active for different segments of the media presentation.

Alternatively/additionally, a plurality of such associations may be concurrently active for a particular segment (or the entire) corresponding media presentation 115, wherein an active association is an association whose associated supplemental information will be presented if a pause occurs. In one such embodiment, a first plurality of associations may be active in a first segment of the corresponding media presentation 115 such that all supplemental presentations for each of the active associations is presented each time the media presentation is paused in the first segment. Additionally, a second plurality of associations may be active in a second segment of the corresponding media presentation 115 such that all supplemental presentations for each of the second plurality of active associations is presented each time the corresponding media presentation is paused in the second segment. Accordingly, if, e.g., the first segment of the media presentation 115 had content for a particular brand of swim wear and a particular type of surfboard, and the second segment had content for a particular sunscreen product and the swimwear, then: (a) the first plurality of associations may identify both supplemental information/presentation for the swimwear and additional supplemental information/presentation for the surfboard, and (b) the second plurality of associations may identify the supplemental information/presentation for the swimwear and a supplemental information/presentation for the sunscreen product. Note that such dynamically activated associations may be activated and/or deactivated according to an elapsed time for the media presentation 115 (e.g., excluding all elapsed time when the media presentation is paused), or more precisely, activated and/or deactivated according to a media presentation 115 time value indicative of what portion of the corresponding media presentation has just been presented, is being currently presented or remains to be presented.

Other complex association functionality is also within the scope of the present disclosure such as dynamically determining the one or more active associations (for identifying corresponding supplemental information/presentations to present) according to, e.g., both the time of a pause and a selection of a subarea or a feature within the corresponding media presentation 115. For example, in one embodiment, different associations may be dynamically identified with different presentation subareas of the media presentation 115 so that when a pause of the media presentation is indicated by a viewer user selecting or clicking on a particular subarea of the media presentation, the association(s) that has been dynamically identified with the particular subarea will be used to identify the supplemental information/presentation(s) to present for the association(s). For example, for a media presentation 115 presenting both swimwear and a particular automobile, if a viewer user clicks near the swimwear for pausing the media presentation, a supplemental presentation for the swimwear is presented, and if the viewer user clicks more near the automobile, a supplemental presentation for the automobile is presented. Note, the determination of what "near" means in the above example may vary. In one embodiment, "near" may be determined as within a predetermined quadrant of the media presentation 115, or within a predetermined rectangle of pixels surrounding the image of an object, e.g., the automobile, wherein a viewer user selection click within the rectangle causes the media presentation to pause and the associated supplemental presentation (e.g., for the automobile) to be presented.

Referring now to FIG. 2A, the user interface shown in this figure will now be described. The presentation 200 of FIG. 2A is an initial view of a multimedia pause switching presentation displayed by a multimedia player 114. The multimedia player 114 provides components of the presentation 200 for standard multimedia controls including a conventional play/pause button 210, a volume control 240, as well as forward, reverse, and pause controls. The multimedia player 114 also provides components for providing a video timeline 220 for informing the viewer user of the length of the media presentation 115 for the pause switching presentation, the amount of the media presentation 115 viewed and at amount of the media presentation remaining to be viewed. The multimedia player 114 also provides a supplemental presentation button 230 (also referred to herein as a "pause and buy button"). When the button 230 is selected, the media presentation 115 is paused and supplemental information associated with the media presentation is presented, wherein such supplemental information may advertise a product or service of a sponsor (e.g., advertiser) and/or distributor of the multimedia pause switching presentation. The button 230 may also provide the viewer user with multimedia player 114 options (e.g., size of player on the screen, the speed at which the video of a media presentation 115 will play, various multimedia player skins, etc.).

The multimedia player 114 of the pause and buy system may be an enhanced version of various multimedia platforms or media players (e.g., Adobe Flash Player, Microsoft Silver-Light Player or other multimedia players), wherein the enhancements include providing the functionality of the button 230, determining active associations, and appropriately presenting supplemental presentation when the button 230 is activated. In particular, such a multimedia player 114 preferably makes use of the associations provided by a multimedia pause switching presentation for appropriately switching between presenting the corresponding media presentation, and the corresponding supplemental presentations. Furthermore, the multimedia player 114 is also able to provide the supplemental presentations as interactive, graphical overlays that may be positioned at least over one portion of the area in which the corresponding media presentation 115 is being presented. In at least one embodiment of the pause and buy system, such overlays are distributed to the user viewer's web browser 112 having the multimedia player 114 as a plug-in or add-on thereto.

Referring to FIG. 2B, when the viewer user temporarily halts or pauses the corresponding media presentation for a multimedia pause switching presentation, a graphic overlay in a form of a product panel 250 (FIG. 2B) may be displayed over at least one of: (a) a portion of the media presentation 115, (b) a top edge 256, (c) a bottom edge 257, (d) a first lateral edge 258, and (e) a second lateral edge 259. The product panel 250 shown in FIG. 2B displays the supplemental presentations, which may be a plurality advertising product presentations 270 (i.e., 270a, 270b, 270c, 270d and 270e in FIG. 2B), wherein each such advertising product presentations displays a particular product, e.g., shown in the corresponding media presentation 115. In at least one embodiment of the pause and buy system, all of the product panel 250 resides within the edges 256-259 of the corresponding media presentation 115. Alternatively/additionally, the product panel 250 may display a selection of thumbnail images or icons of all the products (or services) for the supplemental presentations which may be, e.g., superimposed over at least a portion of the halted or paused corresponding media presentation 115. Note, to simplify the description hereinbelow, the terms "product", "products" and "product(s)" are to be interpreted as being synonymous, respectively, with the terms "product or service", "product(s) or service(s)", and "products or services".

In at least one embodiment of the multimedia player 114, the presentation 200 therefor includes scroll controls 260 and 261 (FIG. 2B) is located in the product panel 250 to allow the viewer user to see and scroll through all the featured products within the product panel 250. More specifically, clicking on scroll control 260 allows the viewer user to shift the currently displayed product presentations 270 to the right bringing into view another product presentation 270 in the leftmost product presentation space. Additionally, clicking on scroll control 261 allows the viewer user to shift the currently displayed product presentations 270 to the left bringing into view another product presentation 270 in the rightmost product presentation space. In the embodiment of the pause and buy system of FIG. 2B, there are primary and secondary product presentation spaces, wherein the primary product presentation space (corresponding to product presentation 270c) may be the most prominent and/or in the center of the product panel 250. Moreover, the secondary product presentation spaces (corresponding to product presentations 270a, 270b, 270d and 270e) provides advertising that is displayed less prominently and/or in a less central position and/or with reduced clarity, detail or color. For example, primary product presentation space 262 is located at the center of the product panel 250, with secondary product display space 264 that is adjacent to the primary product display space 262.

In at least one embodiment of the pause and buy system, the viewer user may select a thumbnail image or icon of a product presentation 270, and additional supplemental information related to the product presentation is provided within the overlay as an expanded product panel 280 (FIG. 2C), or a new tab or window in the web browser 112 (FIG. 1). In at least one embodiment, the expanded product panel 280 is also displayed over at least a portion of the corresponding media presentation 115. In at least one of the embodiment of the pause and buy system, the expanded product panel 280 displays additional information 290 about the product selected, including, for example, (a) reviews of the product by other individuals, (b) purchasing information, and links to other static and dynamic WWW content, (c) other pictures or images of the product, (d) additional videos of the product, (e) hyperlinks to other web sites, (f) news alerts related to the product, (g) real simple syndication ("RSS") feeds related to the product, (h) bookmarks or relevant universal resource identifiers ("URI") and locations ("URL") on the WWW related thereto, and (i) discounts or coupons related to the product or to the delivery or purchase of the product.

As one skilled in the art will appreciate, the content and services displayed in the expanded product panel 280 may be distributed by more than one web server 140 in FIG. 1 (or various servers 1140, 1000, or 1190 of FIG. 11 described hereinbelow) on the computer network 100. In at least an embodiment of the pause and buy system, the expanded product panel 280 also allows connectivity or access to other services such as, for example, a "shopping cart", a "wish list", a purchasing link 292, a presentation customization link 294, an e-commerce service (e.g., a product procurement link, or purchase order link), a physical shipping and/or delivery network, financial transaction institutions, blogging applications, a link to customize the selected product 294, and Internet-based auction systems.

Examples of corresponding media presentations that may have related advertising as supplemental presentations include media presentations of athletes or sporting events, instructional media presentations (do-it-yourself, construction, renovation, repair, cooking, educational, etc.), fashion show media presentations, commercials of any product, news casts, television shows, movies, movie trailers, adult entertainment, and personal or home videos. By way of example and not limitation, typical situations where there may be a direct correlation between such a media presentation and advertising may be provided by manufacturers, distributors, and sellers of any product where such entities showcase any video containing their product(s) in a product panel 250. For example, television shows that focus on financial markets, such as stocks and other commodities, can be enhanced by corresponding supplemental presentations, wherein, instead of featuring physical products in the product panel 250 and/or extended product panels 266, stocks as discussed in the corresponding media presentation can be featured in the supplemental presentations. Moreover, the extended product panel 266 for such a multimedia pause switching presentation may include dynamic information (such as real-time feeds of the current price of the stock, RSS, tickers, marquees etc.), static information (such as hyperlinks to other web sites), and trading and purchasing information.

In at least one embodiment of the pause and buy system, a product panel 250 (e.g., FIG. 2B) is generated by a viewer user initiated action, where thereafter the corresponding media presentation is not paused by the multimedia player 114, and accordingly the media presentation continues to play. In at least one embodiment of the pause and buy system, a product panel 250 is generated by a viewer user initiated action, where thereafter the corresponding media presentation is not paused or halted, and accordingly continues to play, but wherein after the product panel 250 is closed, the corresponding media presentation returns to the portion of the corresponding media presentation that corresponds to the time when the user initiated action occurred.

In another aspect of the present disclosure, the supplemental information for a product panel 250 is not distributed with the media presentation of a multimedia pause switching presentation. Instead, the corresponding supplemental information (or portions thereof) are distributed to the client node 110 as requested by the multimedia player 114 and/or the viewer user. Moreover, instead of the multimedia player 114 providing a product panel 250 as described above, an external product panel in the form of a graphical overlay or pop-up window may be provided which functions in substantially the same way as the product panel within the multimedia player 114.

"Widget"/"Gadget" Multimedia Player

An enhanced multimedia player for the pause and buy system can operate as a desktop application, commonly known as a "widget" or "gadget", on the viewer user's computer or network node 110. This embodiment of the enhanced multimedia player works in conjunction with a viewer user's on-line account providing the viewer user with the ability to manage (e.g., select, group, and/or categorize) multimedia pause switching presentations that reside at a network server. Maintenance of a viewer user's account is provided in the discussion below of FIG. 10.

Referring now to FIGS. 3A-3F, additional presentations from an enhanced multimedia player are shown, wherein the multimedia player may be a "gadget" application 300 on, e.g., a Microsoft Windows Vista™ desktop as one skilled in the art will understand. However, prior to describing these figures, some background discussion on gadgets is now presented. Gadgets are easy-to-use mini programs that reside on one's desktop that give a user information at a glance and may provide easy access to frequently used tools. Gadgets are mini applications with a variety of possible uses. They can connect to web services to deliver business data, weather information, news updates, traffic maps, Internet radio streams, and even slide shows of online photo albums. Gadgets can also integrate with other programs to provide streamlined interaction. For example, a gadget can provide an at-a-glance view of all your online instant messaging contacts, the day view from a calendar, or an easy way to control a multimedia player. Gadgets can also have any number of dedicated purposes including, for example, calculators, games and sticky notes.

The gadget 300 may sit with other gadgets 340 (FIG. 3A) on the desktop of the computer 110. The gadget 300 provides for the display of: (a) a visual list 312 of available or newly distributed (pushed) multimedia pause switching presentations (e.g., multimedia pause switching presentations that have yet to be viewed), (b) controls 310 for presenting a comprehensive list of available multimedia pause switching presentations that have been identified by the viewer user for later viewing, (c) a pause and buy button 314 that provides information on the available multimedia pause switching presentations (e.g., the number of such presentations available) for the gadget 300. Other user adjustable features available for gadget 300 may be controls for e.g., varying the size of the display of the gadget 300, varying the rate of updates sent to the gadget, varying the size of and speed of on-line video or streaming media played, varying the storage limits for caching media data, due to, e.g., bandwidth restrictions, etc.

Figure 3A:
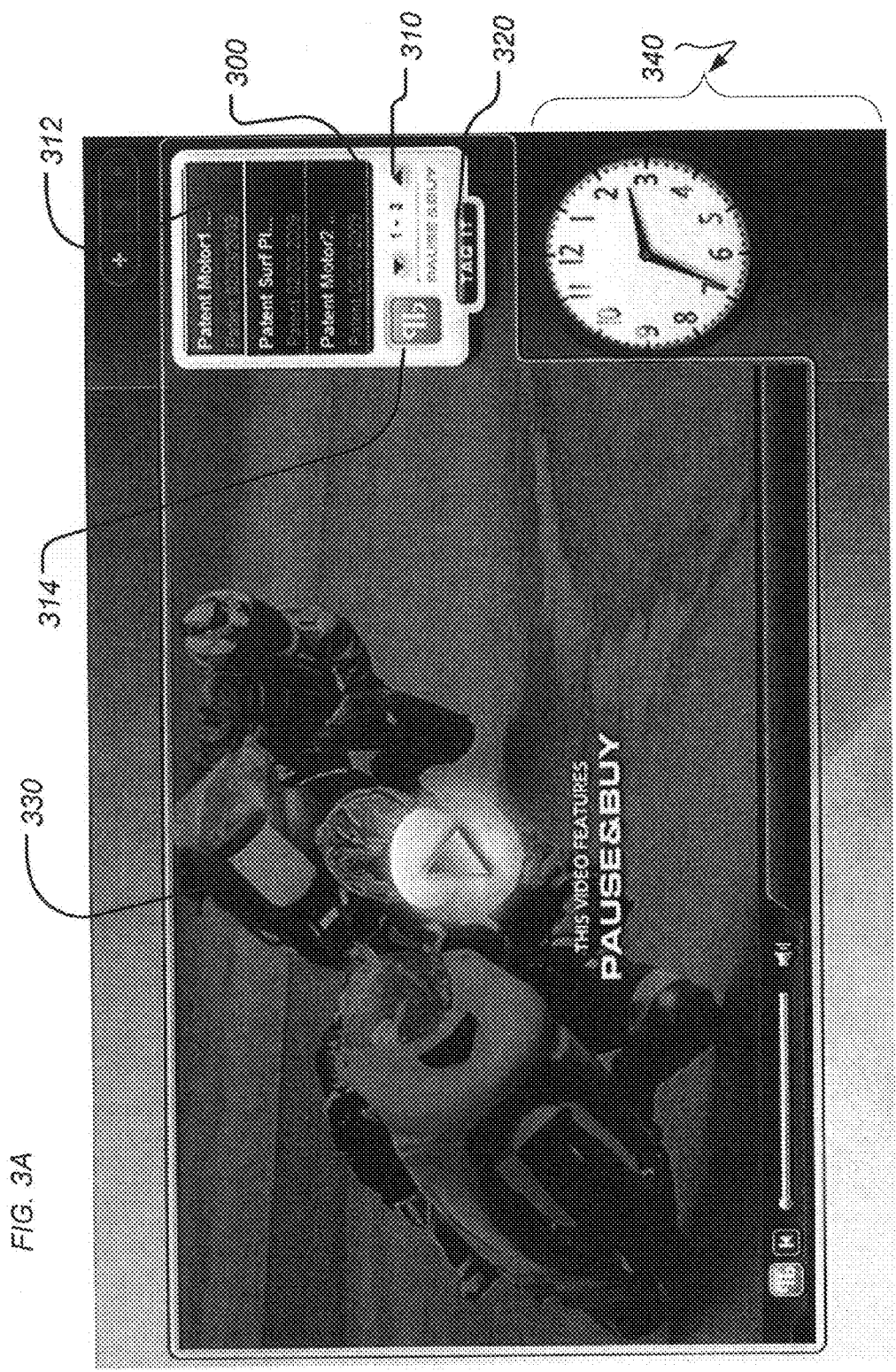
FIGS. 3A-3F illustrate one embodiment of the present disclosure that resides locally on a viewer user's viewing device.
Figure 3B:
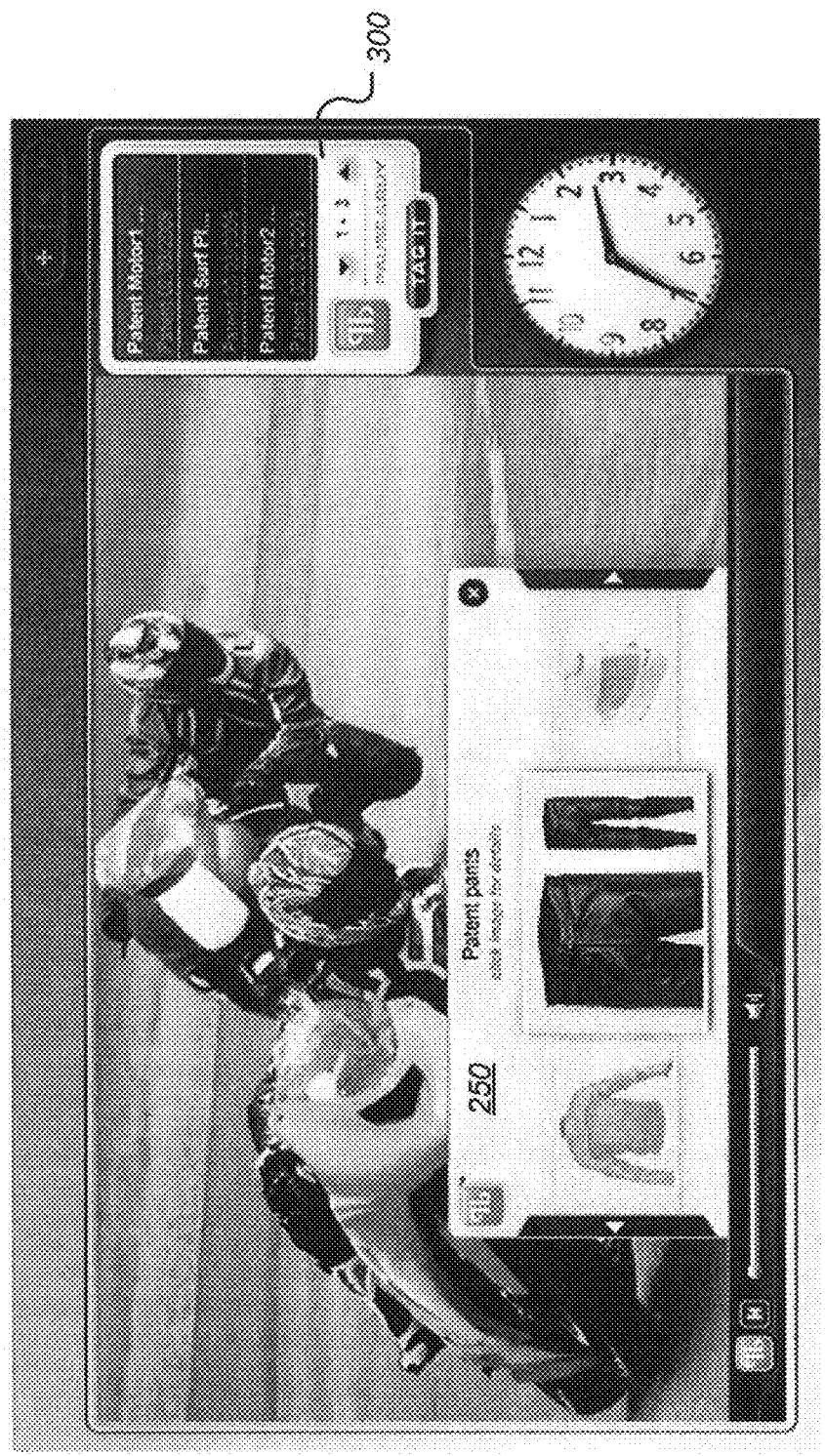
Figure 3C:
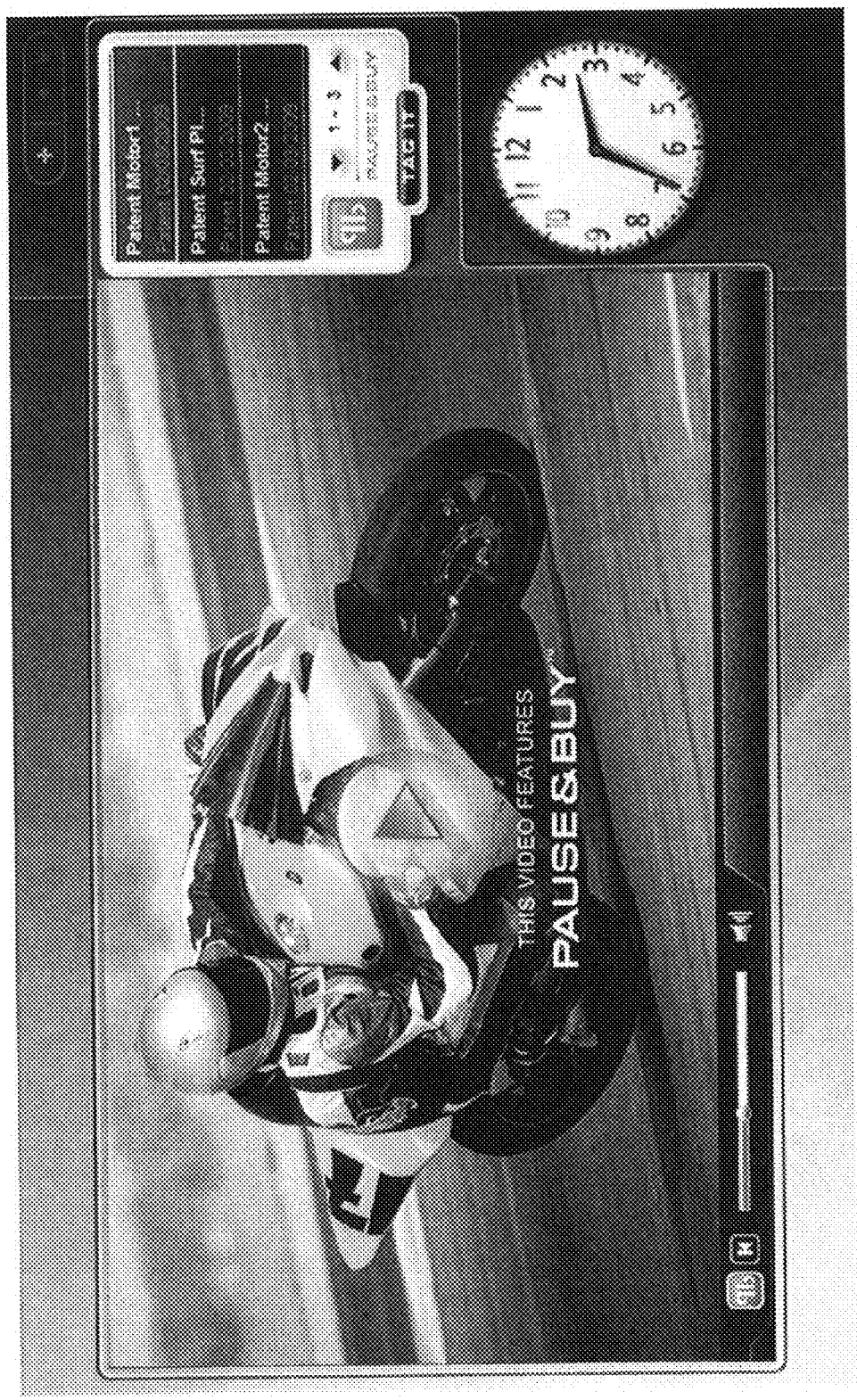
Figure 3D:
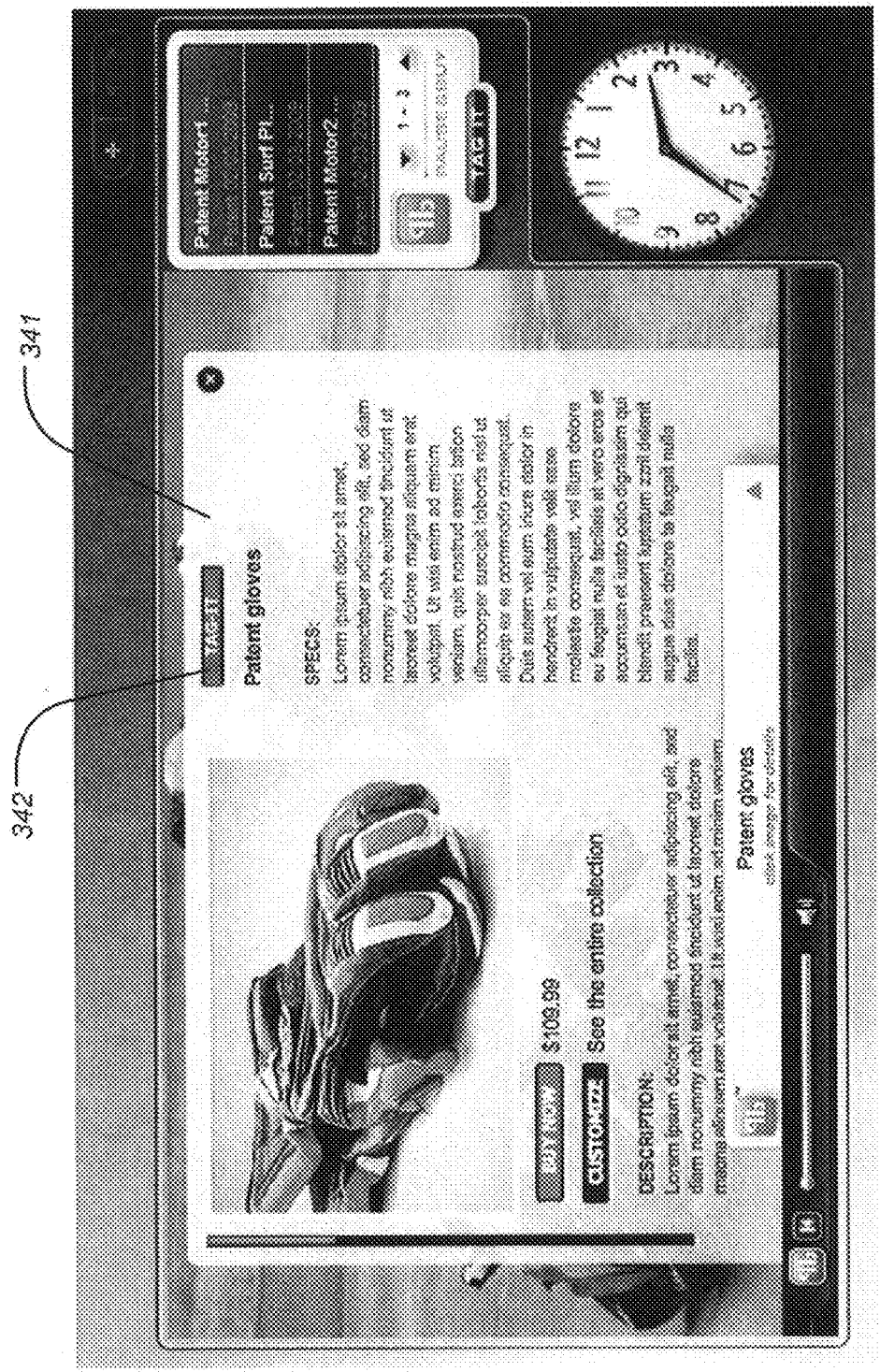

In the embodiment of the pause and buy system using the gadget 300 as the enhanced multimedia player (shown in FIGS. 3A-3F), the viewer user may have previously identified certain multimedia pause switching presentations of interest which reside on one or more network servers, and such identification may be stored with the viewer user's on-line account on the server, or in a temporary/local area (e.g., as session cookies) on the viewer user's computer 110. The enhanced multimedia player 300 of FIG. 3A is shown presenting the corresponding media presentation 330 for a multimedia pause switching presentation. FIG. 3A further shows a "TAG IT" button 320 which when activated allows the viewer user to tag products of interest and create a corresponding tagged product list while the corresponding media presentation 330 is being presented The purpose of tagging products of interest and creating a tagged product list is to create a list of products that may later be reviewed by the viewer user. As shown in FIGS. 3C and 3D, this embodiment of the pause and buy system operates and functions in other manners similar to the multimedia player 114 disclosed above in reference to FIG. 1. FIG. 3B shows the media presentation 330 temporarily halted whereby a product panel 250 appears. Similar to previous pause and buy system embodiments discussed, once a product is selected, an expanded product panel 341 appears as depicted in FIG. 3D.

Figure 3E:
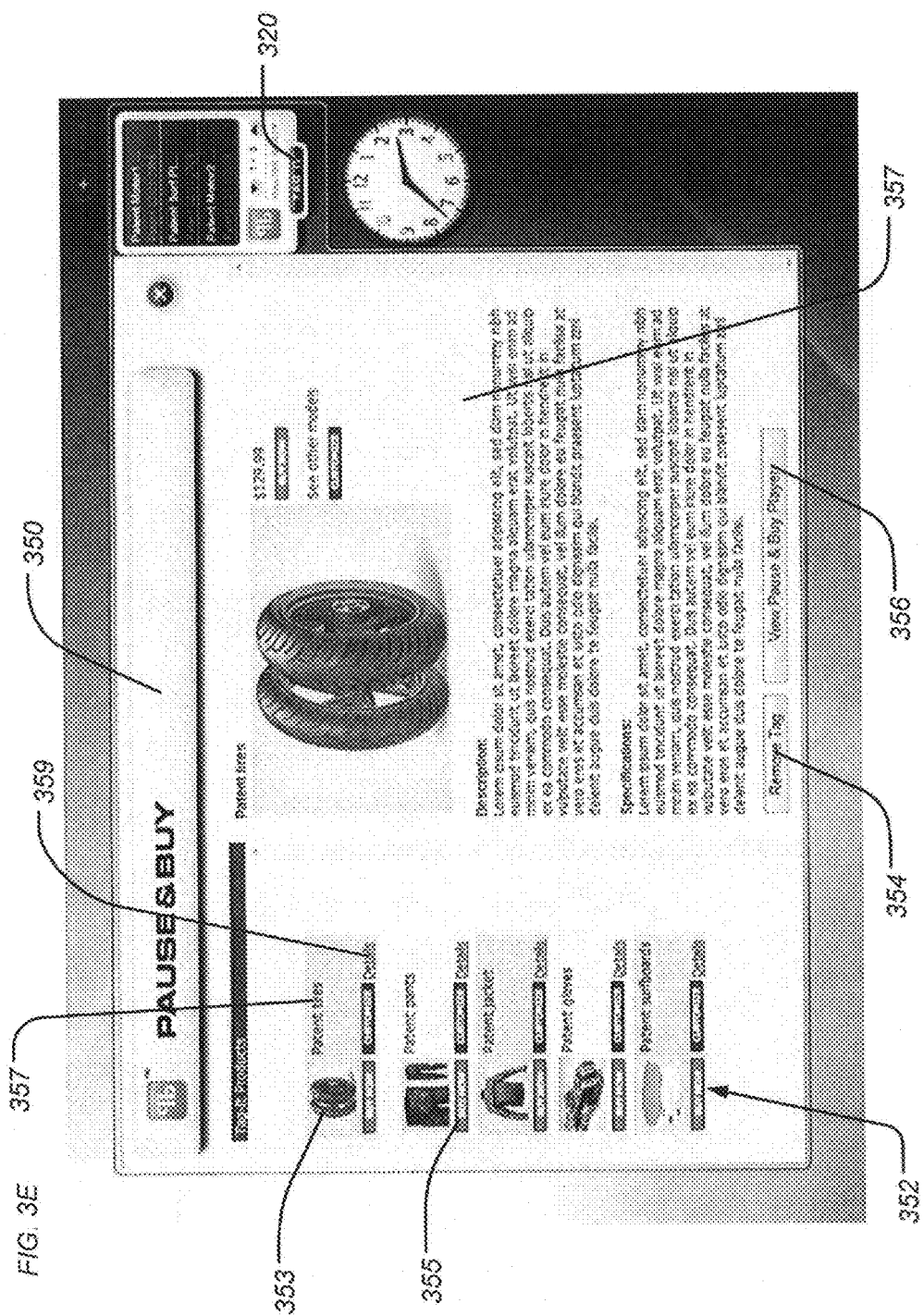

FIG. 3E depicts a panel 350 that is displayed when the TAG IT button 320 is selected. As noted above, the TAG IT button 320 of the gadget 300 creates a display showing a tagged product list 352 comprising a thumbnail image of the tagged product 353, options to purchase the tagged product 355, options to customize the tagged product 357, and a hyperlink to further details 359 of the tagged product. Once the viewer user selects the further details of the tagged product or elects to follow the hyperlink associated with the thumbnail image of the tagged product, the panel 350 also shows detailed information of the tagged product 357. The viewer user may remove the tag by selecting a hyperlinked icon to remove the tag 354. The viewer user is also presented with a hyperlink to view an on-line video of the tagged product 356 through the gadget 300 in accordance with the present disclosure.

Figure 3F:
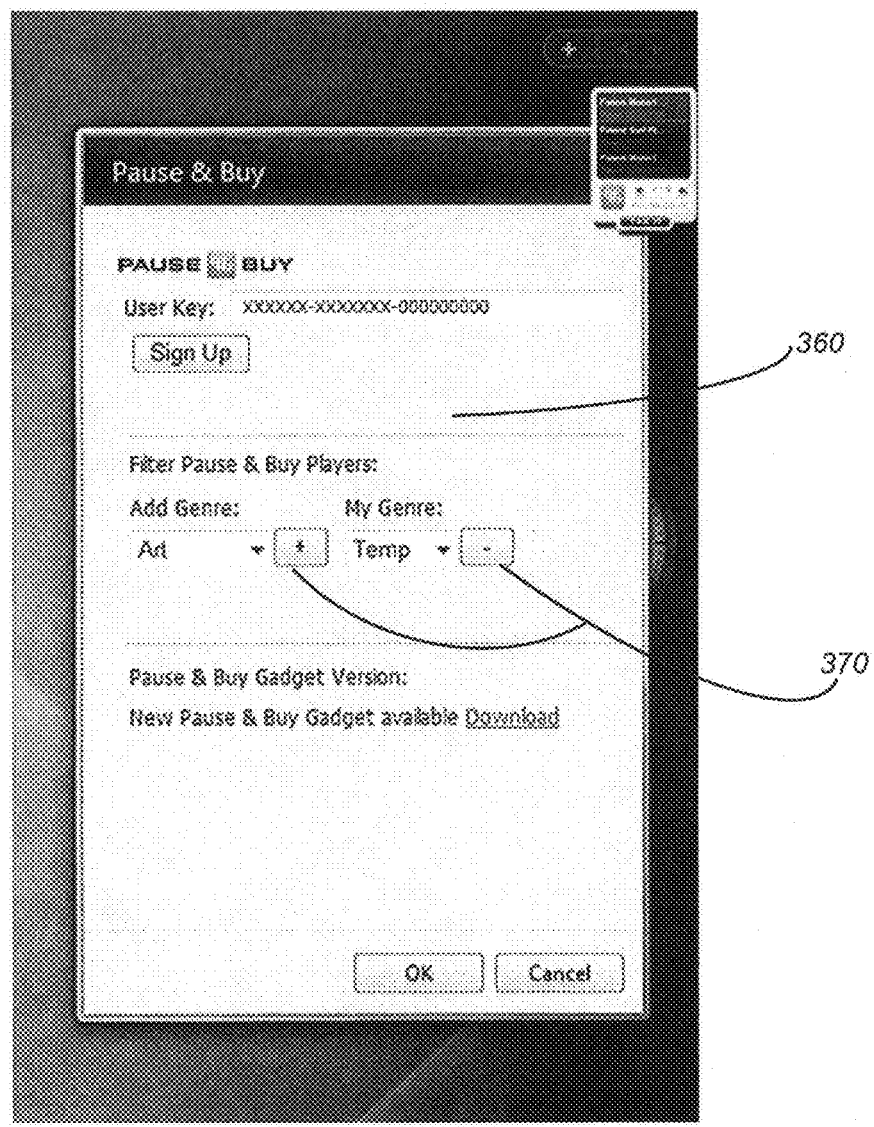

FIG. 3F depicts options for the gadget 300 embodiment providing the enhanced multimedia player. The viewer user is able to access an on-line account through the gadget 300, and by way of a keyword filter 370, the viewer user can control which multimedia pause switching presentations are distributed to the gadget and possibly presented in the list 312 (FIG. 3A) of multimedia pause switching presentations.

Merchant Server Management System/Pause and Buy Server

Referring now to FIGS. 4A-4H, in another aspect of the present disclosure, an interface is shown in these figures for a merchant server management system 1195, FIG. 11, of the pause and buy system. The interface presentation page 400*a* of FIG. 4A allows a merchant to access functionality for performing the following tasks: (a) create a merchant user account for the pause and buy system (e.g., an account for the service broker 1160, FIG. 11, described hereinbelow), (b) manage product presentations that can be displayed in the product and extended product panels 250 and 266, and (c) manage the multimedia pause switching presentations that can be played with the multimedia player 114 (or with the gadget 300; note, hereinbelow, the term "multimedia player 114" will be used to identify the gadget 300 embodiment as well unless specifically noted otherwise). Accordingly, a merchant user may be a person, or other agent designated by a merchant to act on behalf of the merchant, for providing media data and associated supplemental information (as described in the Description of Terms section hereinabove) for use with the pause and buy system disclosed herein. As one having ordinary skill in the art will appreciate, a merchant user may have a merchant user account that identifies the user by a username. To access the merchant user account and the interface pages referred to in FIGS. 4A-4H, the merchant user may need to login to the service broker 1160 by authenticating himself with a password or other credentials. The merchant interfaces allow a merchant to select multimedia pause switching presentations that can then be played with the multimedia player 114. The merchant product management system 1195 providing the interface pages of FIGS. 4A-4H allows the merchant to create and manage the product panel 250 (e.g., FIG. 2B), and multimedia player 114 characteristics presented to the viewer user.

The merchant is able to manage account information related to the accessibility and availability of multimedia pause switching presentations to be displayed in the multimedia player 114, as well as the look and feel of the multimedia player 114 through a merchant product management system interface. The merchant product management system interface page 400*a* provides the merchant with the following links: (a) a link 440 to reports of statistical data related to the number of users viewing a particular multimedia pause switching presentation, (b) a link 430 related to the number of active multimedia pause switching presentations the merchant has selected to be available to viewer users, (c) a link 420 to a product content library 470 (included in, or be identical with, the item data (database) 1144 for the merchant server 1140, FIG. 11, described below), wherein this library identifies the products the merchant has available to be presented in the product panel 250 or 266. One having ordinary skill in the art will appreciate that the interface pages of FIGS. 4A-4H can be used to present and/or manage additional aspects of the pause and buy system including, for example, (a) the number of views in which a particular product that has been featured in a product panel 250 or 266, (b) the total number of videos that have been played including, for example, the bandwidth that the total number of videos occupy, (c) the specific requests originating from unique internet protocol addresses to view on-line or streaming media content through an embodiment of the pause and buy system, and (d) information related to the viewer's decisions on further viewing or ending the process.

Figure 4B:
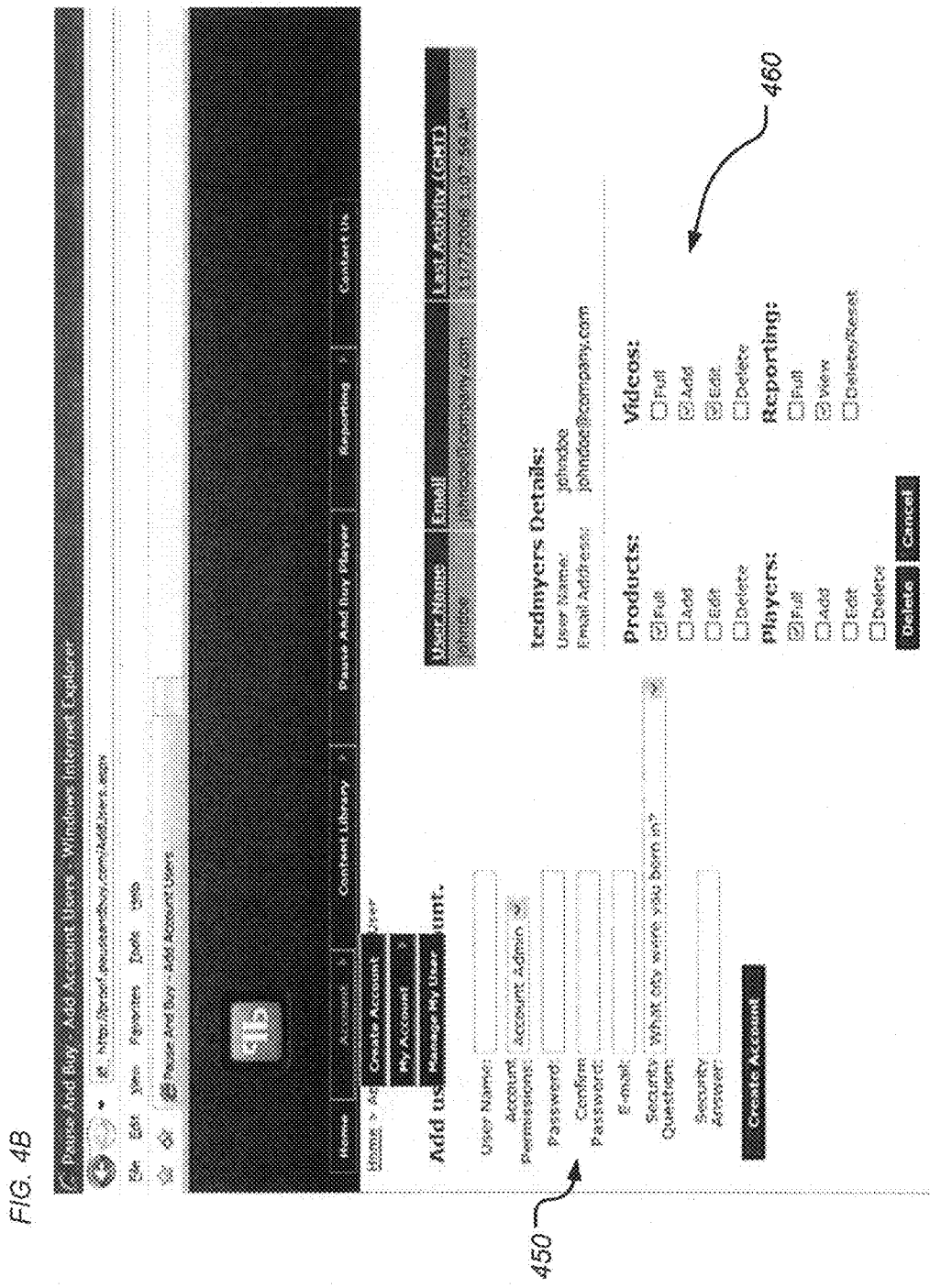

FIG. 4B represents the graphical user interface page 400b for the merchant server management system 1195 (FIG. 11) of the pause and buy system related to basic merchant user account creation information 450 (e.g., user name, password, security questions and contact information, etc.), and the merchant user's permissions/preferences 460 for changing:

(a) product presentations, wherein the permissions are: full (e.g., permission to change product presentations in any way that is available in the item data (database) 1144 of FIG. 11), add (e.g., permission to add new product presentations to the item data (database) 1144), edit (e.g., permission to edit existing product presentations in the item data (database) 1144), and delete (e.g., permission to delete product presentations from the item data (database) 1144);

(b) video presentations, wherein the permissions are: full (e.g., full permission to change, in any way that is available the videos in the streaming media (database) 1148, FIG. 11), add (e.g., permission to add a new video), edit (i.e., permission to edit an existing video), and delete (e.g., permission to delete an existing video);

(c) characteristics of the association of one or more product supplemental presentations to be presented with a corresponding media presentation (such combinations identified as "players" in FIG. 4B), wherein the permissions are: full (e.g., permission to change each of the merchant specific multimedia pause switching presentations 4 in any way that is available), add (e.g., permission to add new multimedia pause switching presentation), edit (e.g., permission to edit existing multimedia pause switching presentations), and delete (i.e., permission to delete multimedia pause switching presentations); and (d) reporting, wherein the terms full, view, and delete/reset performing these reports task, wherein these term have the following respective meanings full: can generate any report capable of being generated,
view: view any report capable of being generated from predetermined client approved report template,
delete/reset: delete a report or data related thereto.

The merchant user permissions/preferences 460 may also control for the generation and viewing of reports, e.g., user permissions for generating, viewing, deleting and/or resetting reports.

Figure 4C:
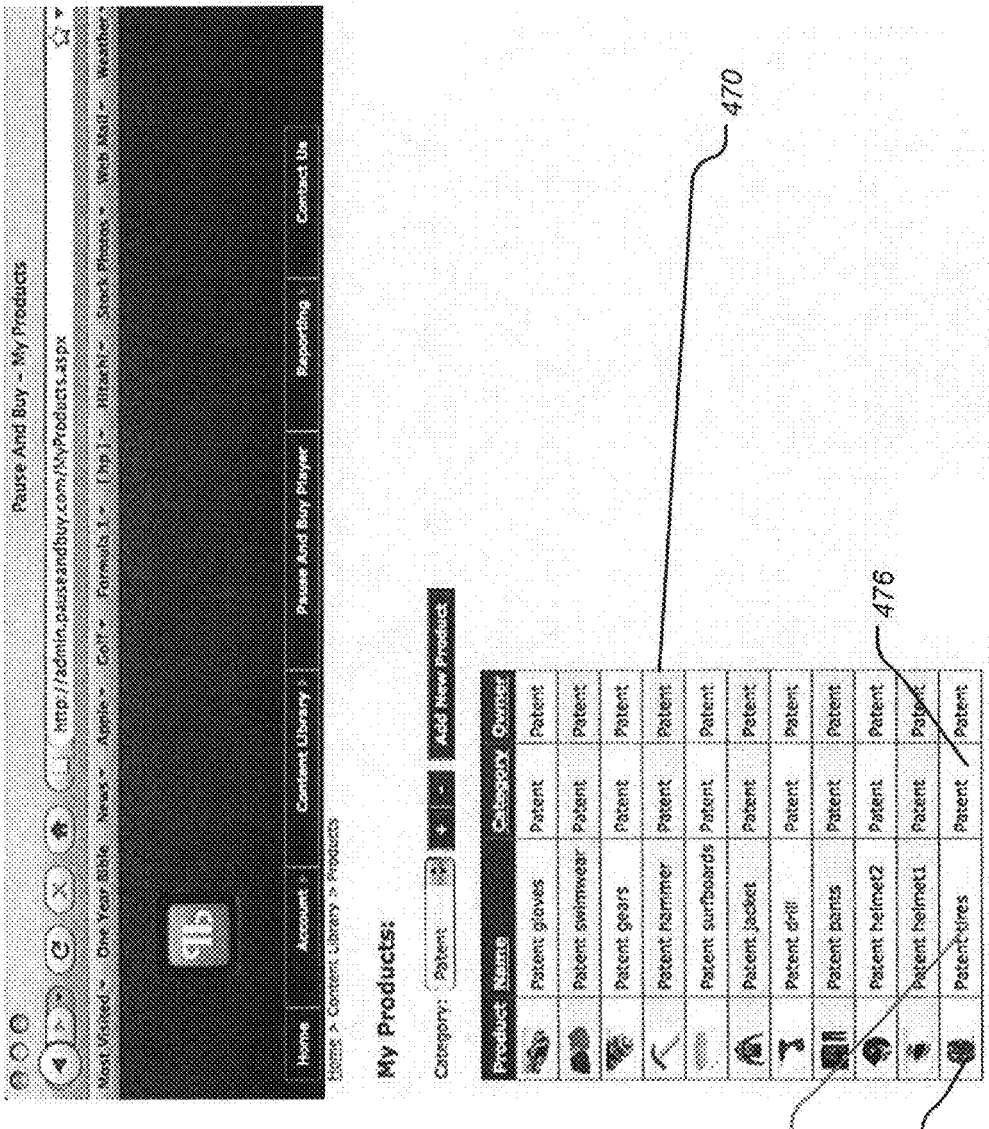

FIG. 4C represents the graphical user interface page 400c for the merchant server management system 1195 (FIG. 11) of the pause and buy system related to the creation of a product content library represented by the list 470, wherein the product content library may be included in (or be identical with) the item data (database) 1144 for the merchant server 1140 (FIG. 11). The list 470 of the content library is shown as a list of products, wherein for each of the products, the list may display a thumbnail 472 of the product, a name 474 of the product and a category 476 for the product.

Figure 4D:
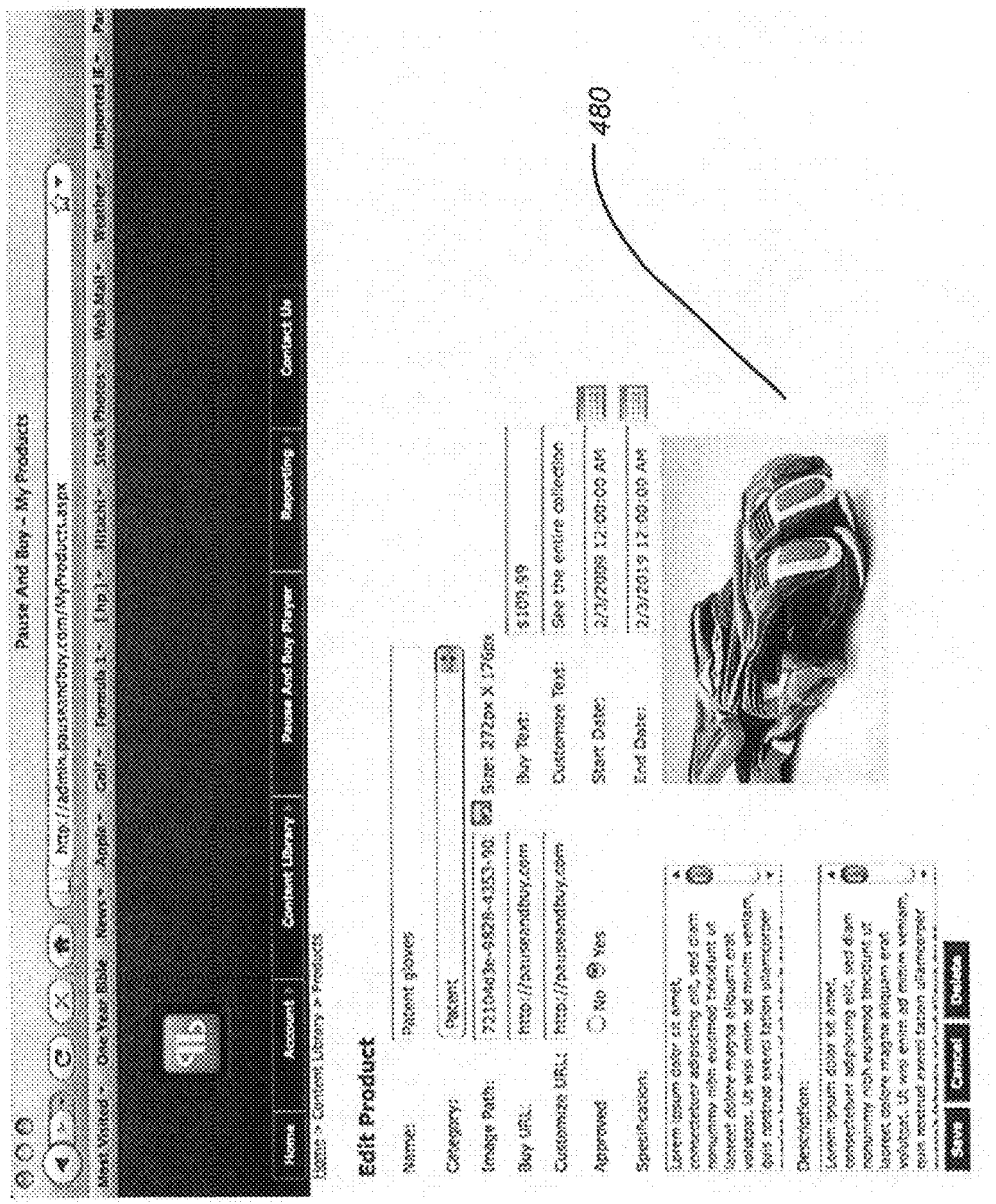

FIG. 4D shows the graphical user interface page 400d, and in particular, the product information details interface 480 for one of the products of the product content library for database 114. The product information in this interface 480 may be defined for each product in the product content library or the item data (database) 1144. The level of information and the method of obtaining and entering the information for a corresponding product in the interface 480 is dependent, e.g., the strategy used in marketing each product and the target buyers therefor. In general, however, at least the following information is provided for each product regardless of the marketing strategy implemented: a specification of the product, a description of the product, a pathname identifying where an image for the product is located, a URL to purchase the product, and optionally a URL to customize the product.

Figure 4E:
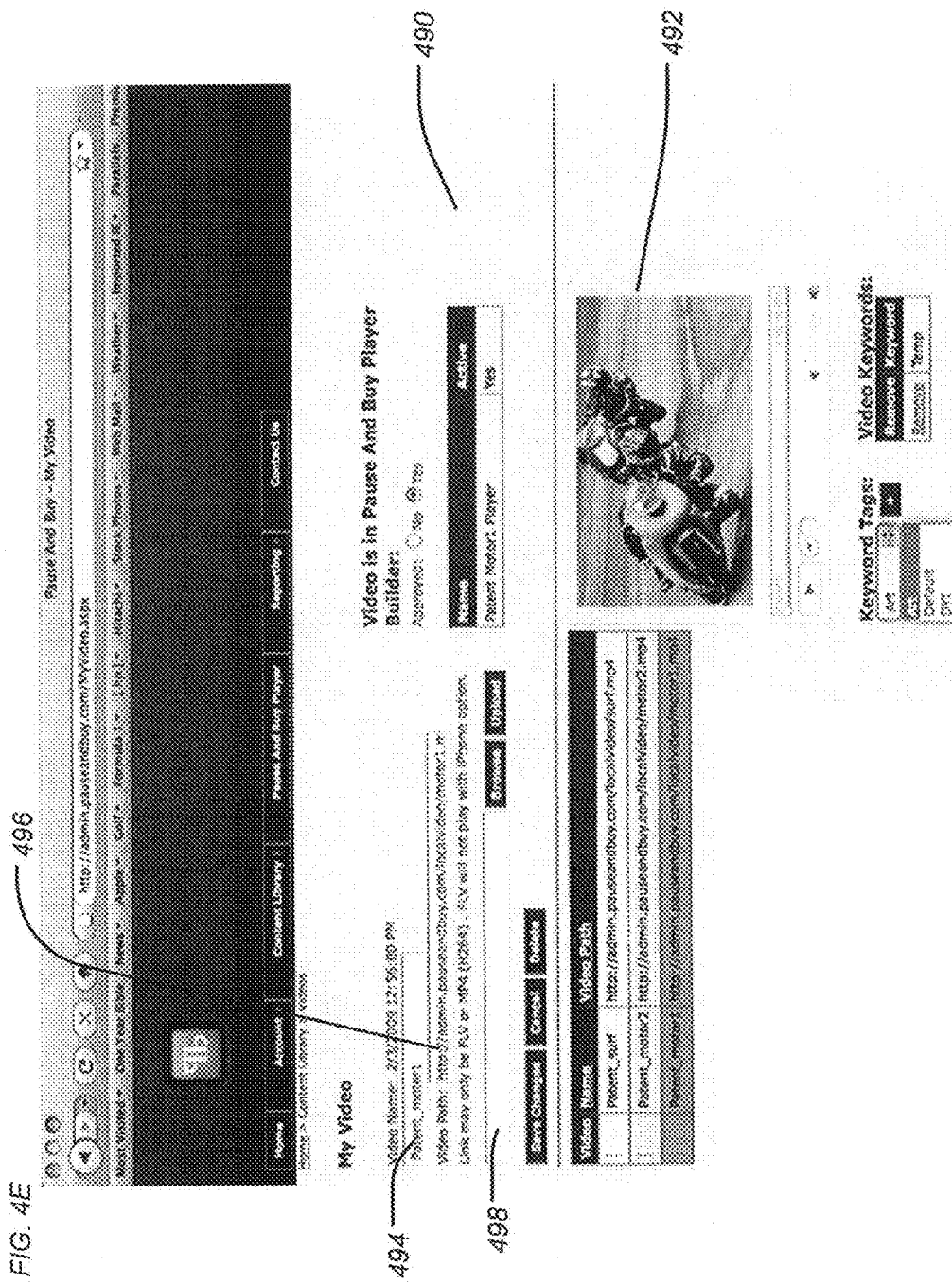

FIG. 4E represents the graphical user interface page 400e for the merchant server management system 1195 (FIG. 11) of the pause and buy system related to the contents and locations of multimedia pause switching presentations presented to the multimedia player 114. The bibliographical information 490 related to each multimedia pause switching presentation is presented on the graphical user interface of FIG. 4E including a thumbnail view of the multimedia pause switching presentation 492, a name given to the multimedia pause switching presentation 494, the path or the server 496 that will be providing the multimedia pause switching presentation, or, alternatively to the path or the server 496, a merchant user may browse and upload 498 multimedia pause switching presentation to the server 1000 (FIG. 11).

Figure 4F:
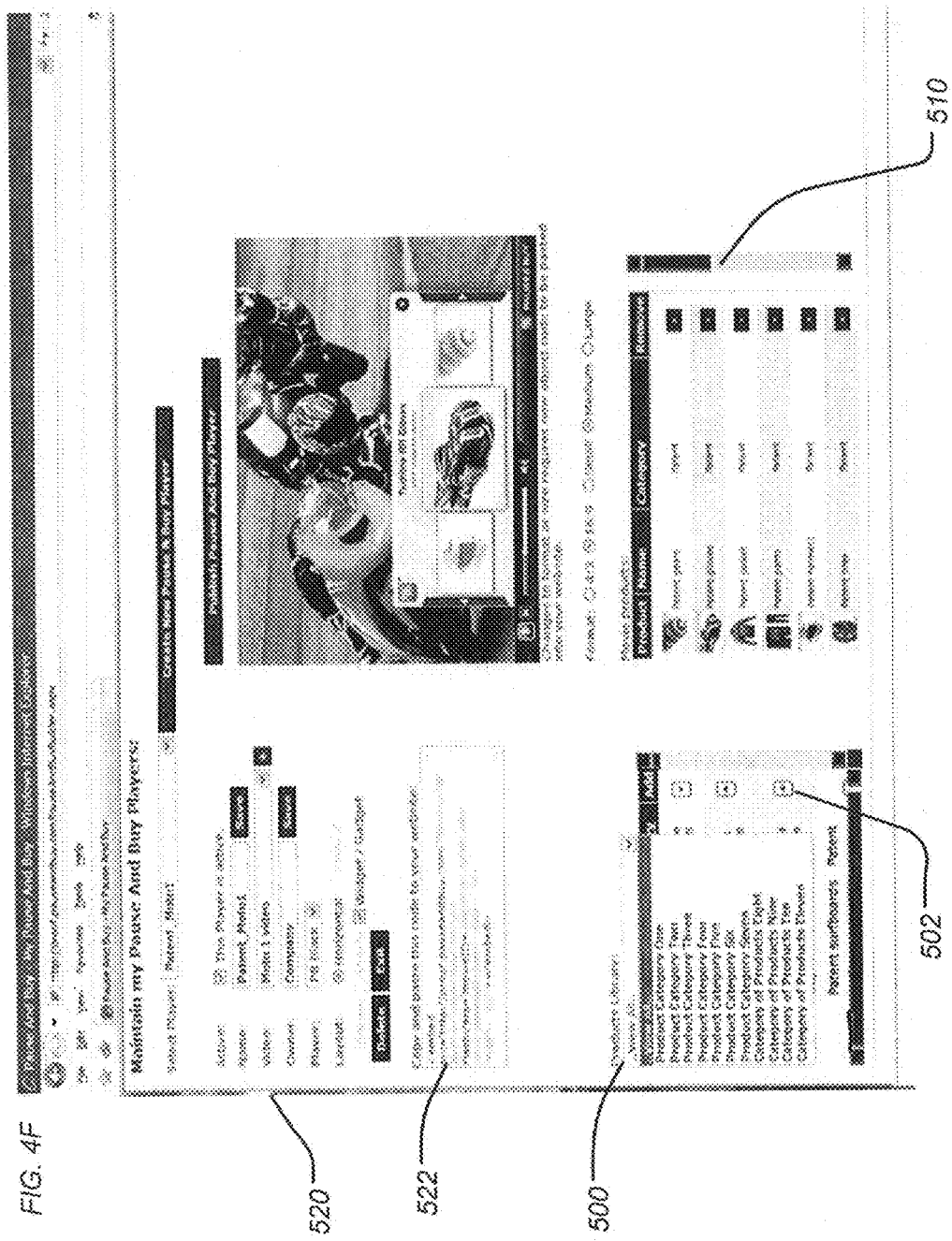

FIG. 4F represents the graphical user interface page 400f of the merchant server management system 1195 (FIG. 11) of the pause and buy system that allows the merchant user to maintain its multimedia pause switching presentation. The merchant user may select products from its product content library and associate supplemental information for the products with a media presentation. In this particular embodiment, the merchant user may associate supplemental information for a product with data defining a media presentation by selecting a product category in the drop down control 500, and using controls 502 to perform the association. The supplemental information associated with a media presentation are displayed in the panel 510. The interface also shows bibliographical information 520 about a resulting multimedia pause switching presentation to be distributed, as well as html code 522 to be placed on at a location viewed by viewer users.

Figure 4G:
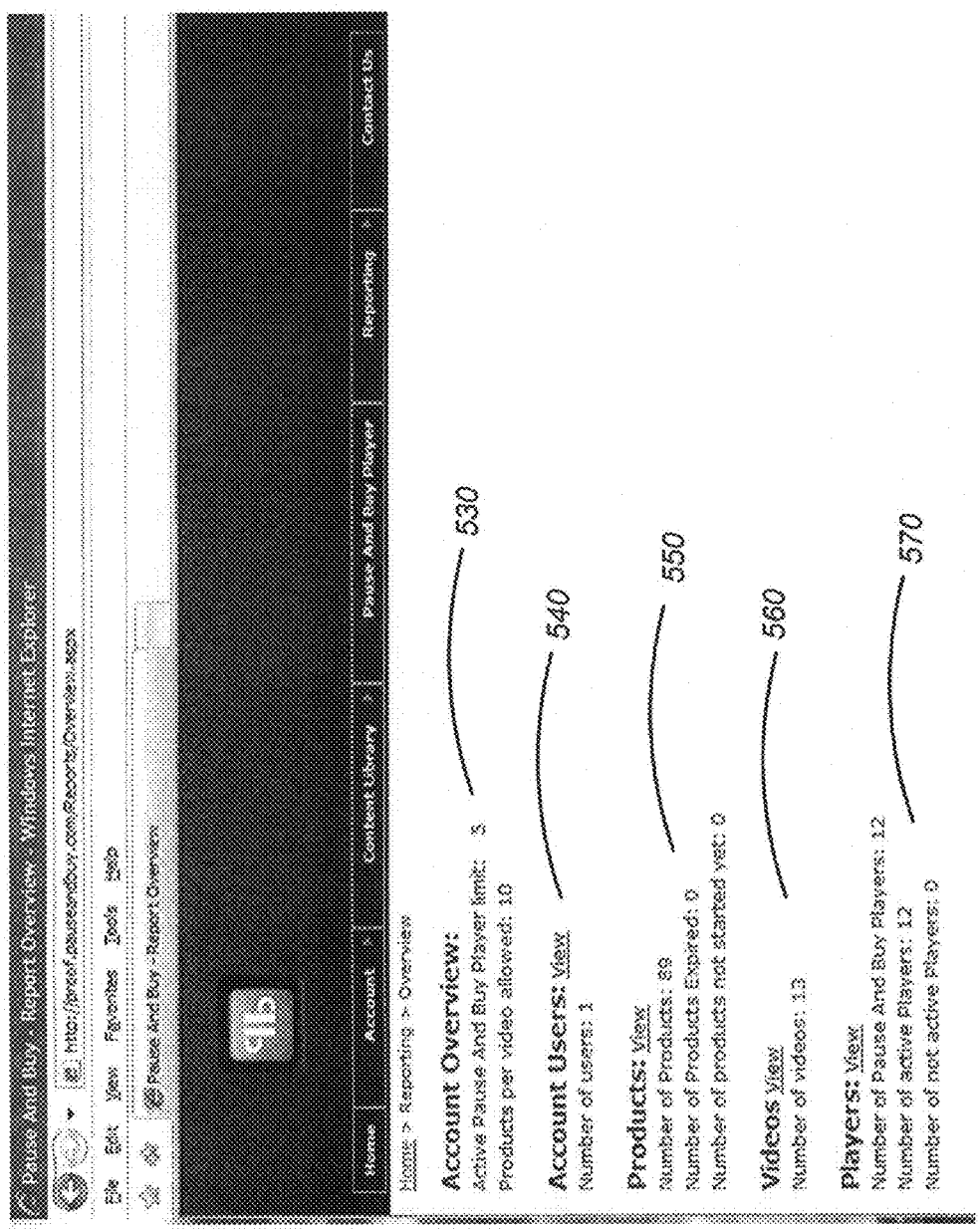

FIG. 4G represents the graphical user interface page 400g of the merchant server management system 1195 (FIG. 11) of the pause and buy system allowing the merchant to review account overview information 530, account user information 540, number of products 550, number of videos 560, and the number and types of active multimedia players 114.

Figure 4H:
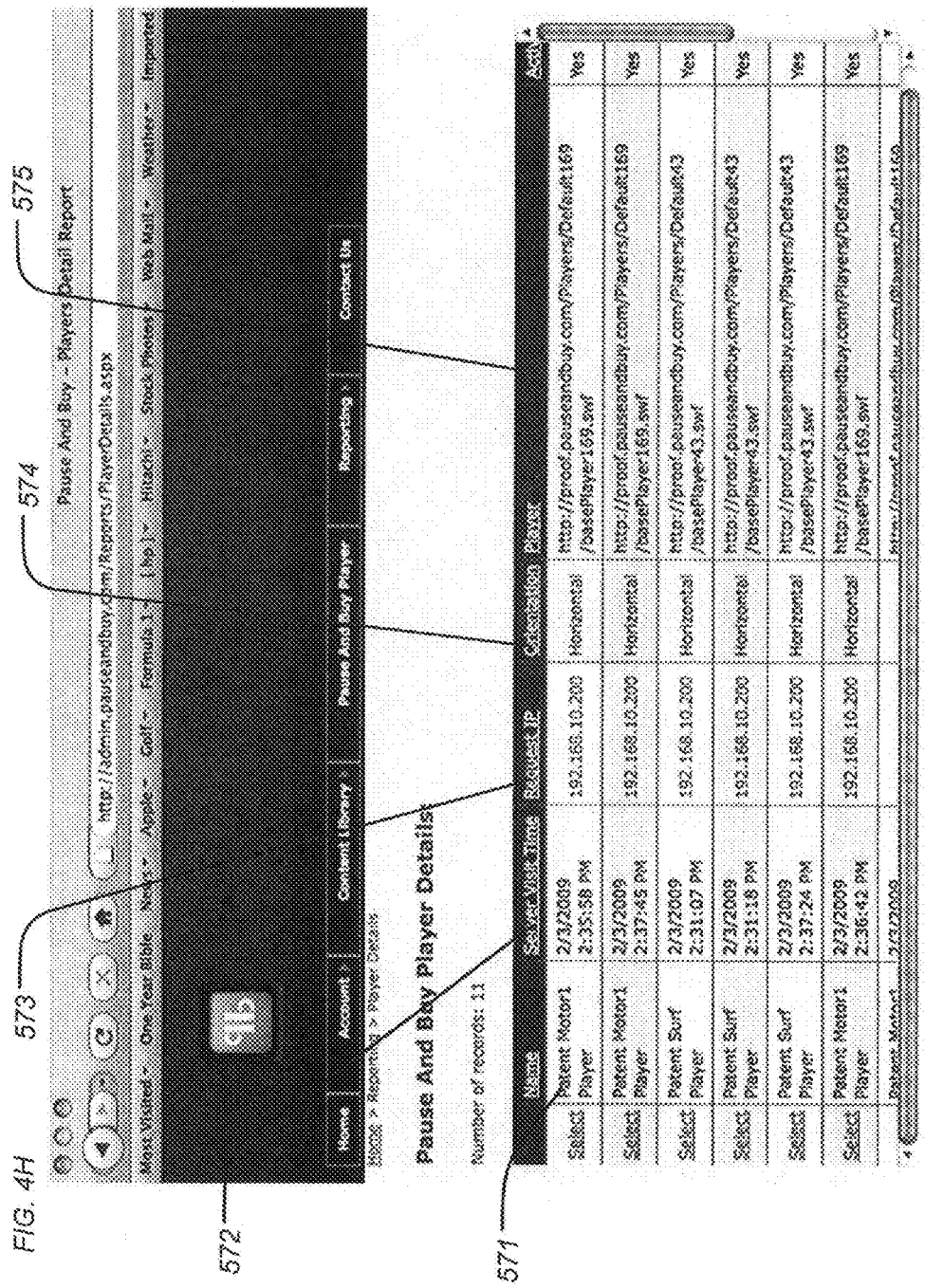

FIG. 4H represents the graphical user interface page 400h which depicts a report provided by the merchant server management system 1195 (FIG. 11) of the pause and buy system, wherein the report provides logging information related to a particular multimedia pause switching presentation as specified in the name column 571, the server visit time 572 (i.e., the amount of time the user spent viewing the multimedia pause switching presentation), the specific requests originating from unique internet protocol addresses 573, the orientation 574 of the multimedia pause switching presentation as provided on a target merchant website and the location 575 in which the multimedia pause switching presentation is distributed. The orientation 574 refers to the orientation of a product panel 250 (e.g., horizontal—products are displayed left to right; vertical—products are displayed top to bottom). The location 575 refers to the specific server and path that presented the multimedia pause switching presentation to the multimedia player 114.

One having skill in the art will understand that aspects of the merchant server management interface (FIGS. 4A-4H) of the pause and buy system may be implemented by a web server 1190 (FIG. 11) that is in communication with the client nodes 110.

Figure 5:
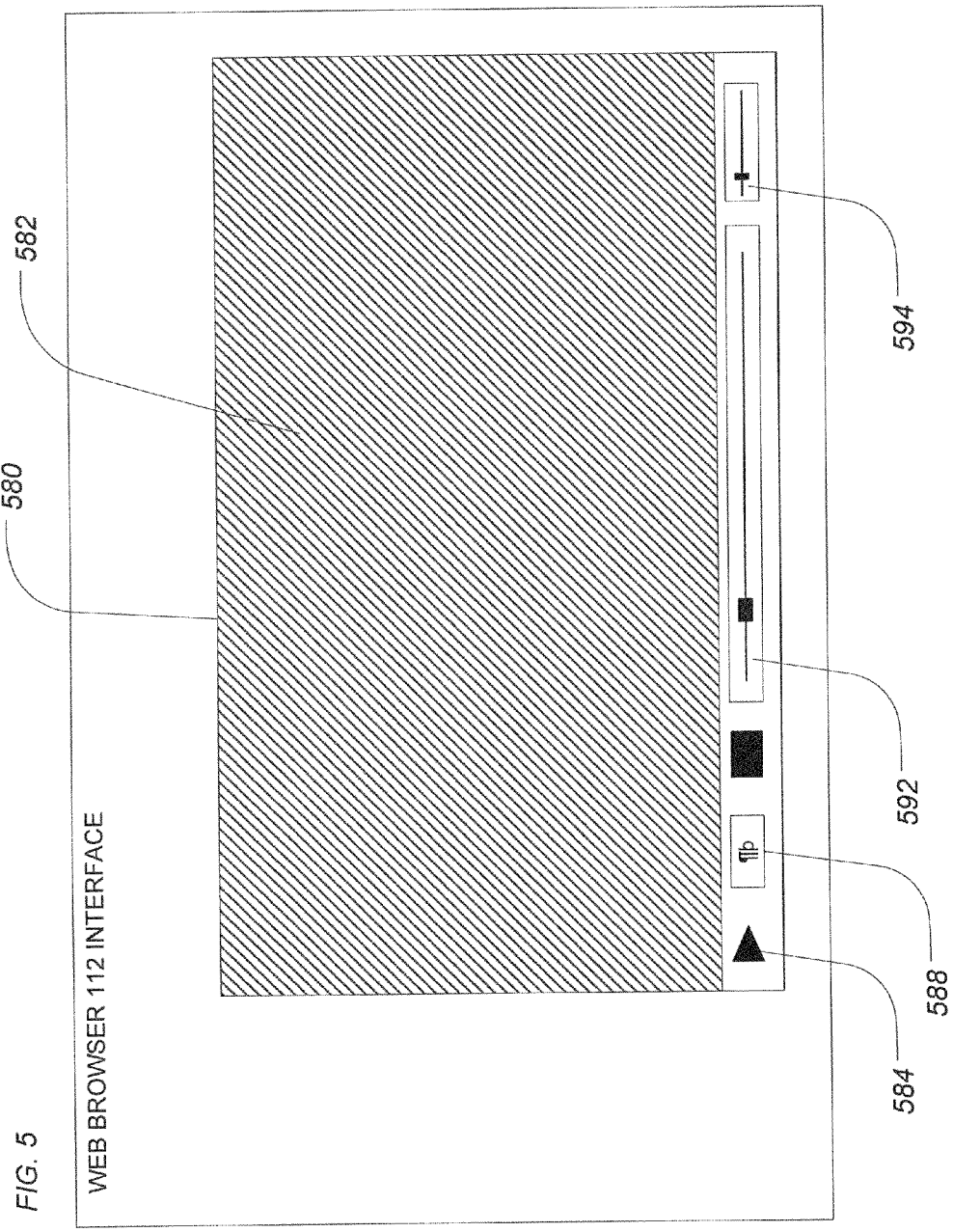
FIG. 5 illustrates a graphical user interface for an embodiment of the present disclosure.

FIG. 5 shows a more abstract embodiment of the user interface 580 for the pause and buy system. The multimedia player 114 may be an enhanced multimedia player based on, e.g., Adobe Flash or Microsoft SilverLight. The multimedia player 114 (FIG. 1—provides the interface by which multimedia pause switching presentations transmitted to a client node 110 is presented to a viewer user, for example, by way of audio and/or visual stimuli. Controls 584, 592 and 594 depict common multimedia player 580 controls such as play/pause, relative position control, and volume control respectfully. In one embodiment, the control 588 (e.g., the pause and buy button 230 of FIGS. 2A-2C) may be used by a viewer user to activate the Pause and Buy Process 1300 of FIG. 13. In another embodiment, the control 588 may be used to display sponsor/advertiser information.

Figure 6:
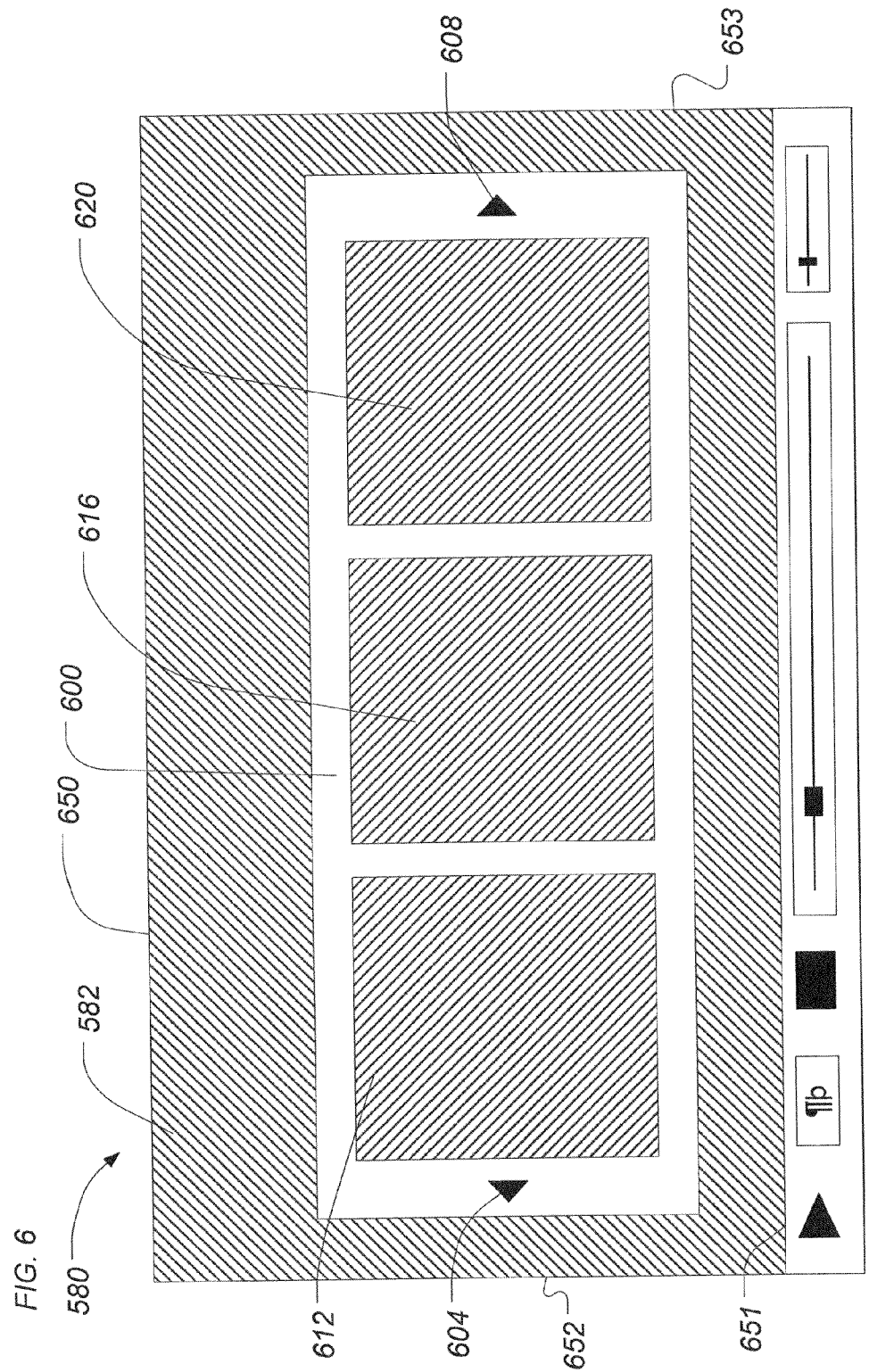
FIG. 6 illustrates another graphical user interface for an embodiment of the present disclosure.

FIG. 6 shows another more abstract embodiment of the interface of the multimedia player 580 showing an accompanying product panel 600 (similar to the product panel 250 of FIG. 2B). The figure shows the multimedia player 580 with a top edge 650, a bottom edge 651, a first lateral edge 652 and a second lateral edge 653. The figure also shows multiple elements 612, 616 and 620 contained within the product panel 600, which is entirely within the bounds of the media player. The controls 604 and 608 (similar to the scroll control 260 of FIG. 2B) may be used by a viewer user to interact with the overlay 600 and elements therein.

Figure 7:
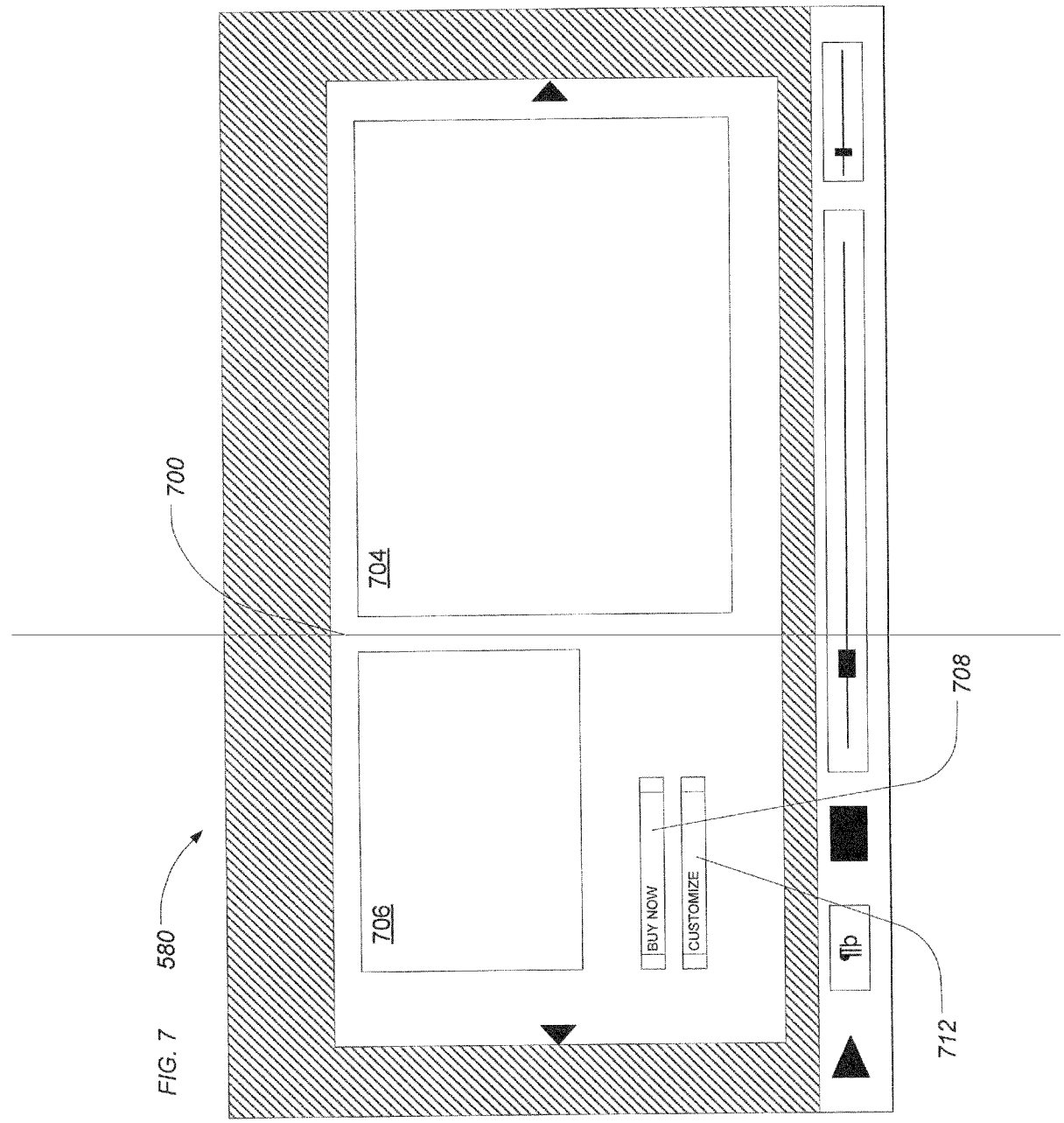
FIG. 7 illustrates yet another graphical user interface for an embodiment of the present disclosure.

FIG. 7 shows yet another more abstract embodiment of the present disclosure that depicts a multimedia player 580 with an expanded product panel 700 (similar to the product panel 280 of FIG. 2C). In this embodiment, expanded product panel 700 shows one method that an item could be presented as a product panel wherein images 706 of the item could be represented adjacent to the item description 704. The figure further illustrates controls 708 and 712 that may be selected by a viewer user to further advance a transaction, for example, in the purchase or customization of the product described therein (similar to controls 292 and 294 of FIG. 2C). One having ordinary skill in the art will understand that this panel may additionally include controls to navigate within the product panel that include, for example, scroll bars, tabbed displays, drop down menus, and radio buttons.

Figure 8:
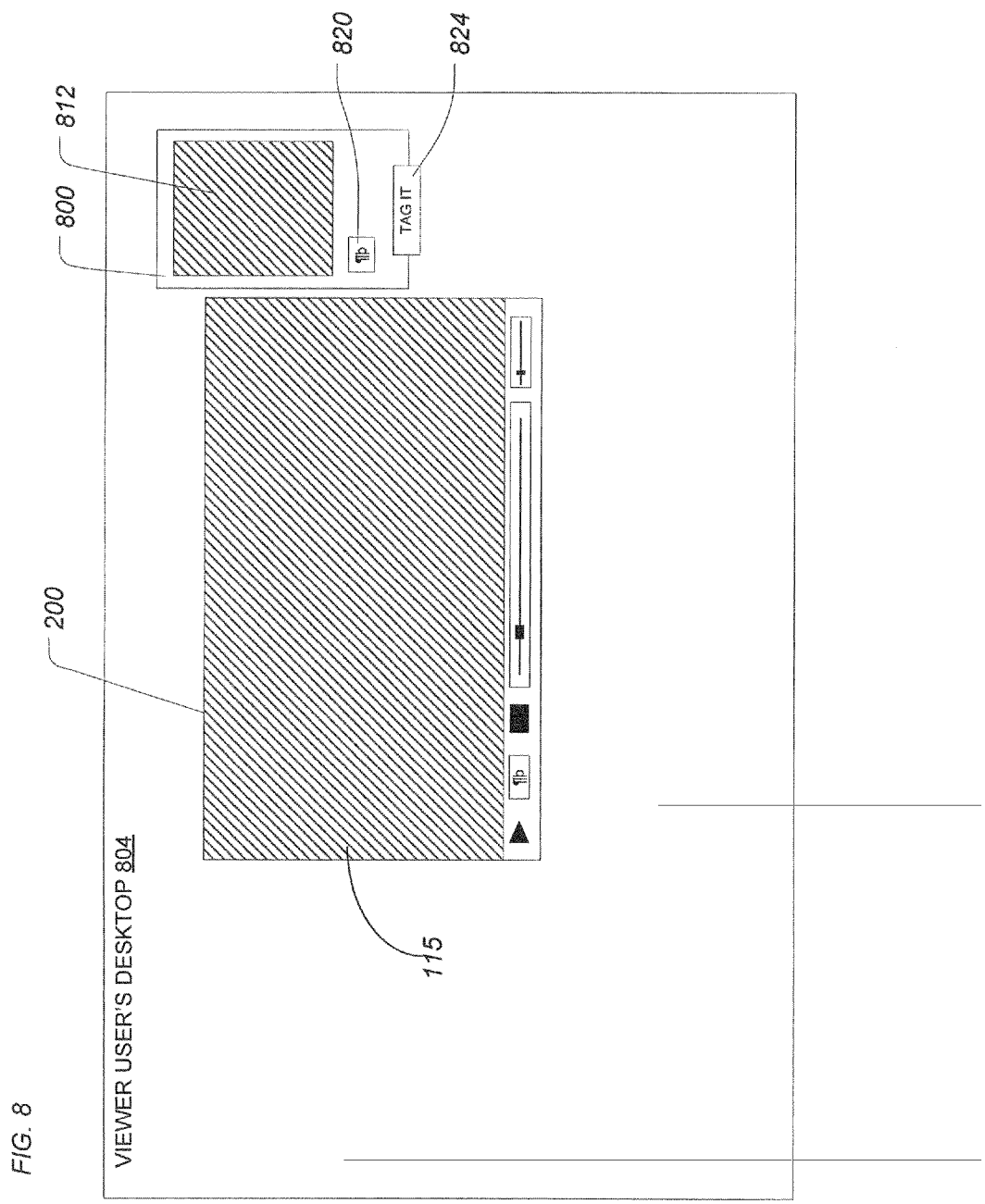
FIG. 8 illustrates one embodiment of a user interface that resides locally on the viewer user's viewing device.

FIG. 8 shows yet another more abstract embodiment of the desktop of a client node 110 that depicts a user interface/presentation 200 of a multimedia player 114 wherein this player is activated by a corresponding widget or gadget 800 (similar to the gadget 300 of FIG. 3A). Similar to FIGS. 3A-3F, this embodiment may present a visual collection 812 of recently viewed multimedia pause switching presentations (similar to the visual list 312 of FIG. 3A). Alternatively, or in addition thereto, the collection 812 may present a list of multimedia pause switching presentations that is, for example, requested by the user, and/or recommended according to user keyword preferences, and/or provided by merchants that sponsor such pause switching presentations.

As in the foregoing description, the viewer user may select a "TAG IT" control 824 (similar to the control 320 of FIG. 3A) to interact with aspects of the gadget 800 as described with reference to FIG. 3A. This "TAG IT" control 824 may be used to provide a viewer user with, for example, keywords related to: (i) a product displayed in an overlay, and/or (ii) a product or service shown in a corresponding media presentation 115. On the server node 1000 (FIG. 11), such keywords may be associated with a viewer user account established by the viewer user, and could be used to create an account profile and/or to tailor supplemental presentations (e.g., advertisements) to the viewer user, and/or could be used in targeted marketing.

Figure 9:
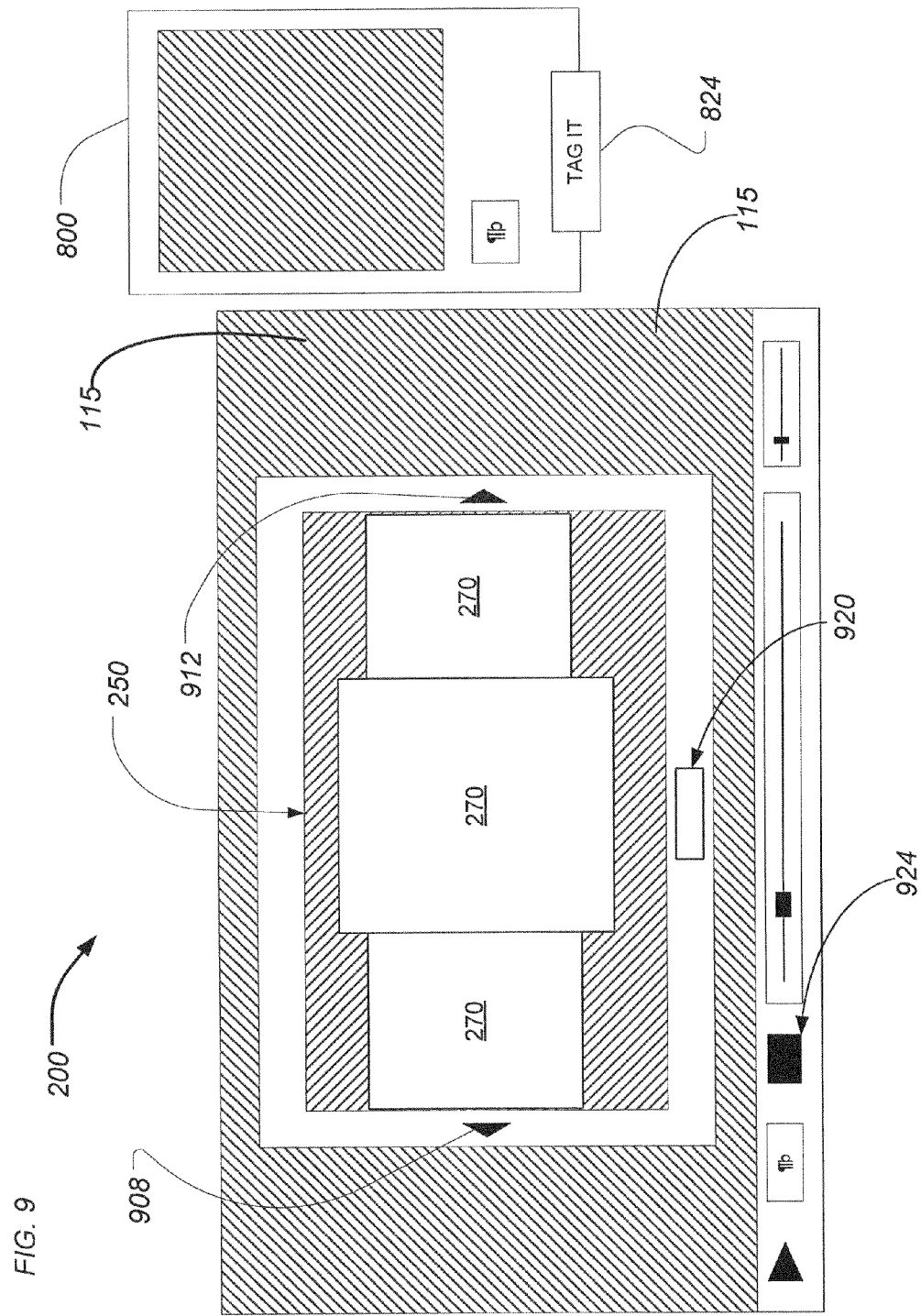
FIG. 9 illustrates another embodiment of a user interface that resides locally on the viewer user's viewing device.

FIG. 9 shows yet another more abstract embodiment of a product panel 250 for the multimedia player 114 corresponding to the widget or gadget 800. As depicted in this figure, the product panel 250 may have scroll controls 908 and 912 (that correspond, respectively, to controls 260 and 261 of FIG. 2B) for enabling a viewer user to navigate or browse between or among different product presentations (advertising) associated with the corresponding multimedia presentation 115. Note that the product presentations 270 (FIG. 3B) provided in the product panel 250 may automatically shift, e.g., left to right when there is no viewer user interaction with the product panel indicating otherwise. Thus, all product presentations may be displayed, and once the last product presentation is displayed, the collection of these product presentations is cycled through again repeatedly wherein the initial rightmost product presentation is presented following the last product presentation. This cycling may continue unless, e.g., the viewer user: (a) closes the multimedia player 114, or (b) requests to (continue to) view the corresponding media presentation 115, or (c) interacts with product panel 250 to view an expanded rendering of one of the product presentations 270, or (d) activates a hyperlink associated with one of the product presentation 270 for receiving additional product information, or (e) positions his/her selection/pointing device image on the product panel, or (f) activates another (if any) control such as a control 920 for explicitly pausing the product presentation, or a control 924 that allows a viewer user to select and transmit an image over a network (Internet) to a remote site as part of a request for more information about a product presented in the image. This feature is described further hereinbelow.

Figure 10:
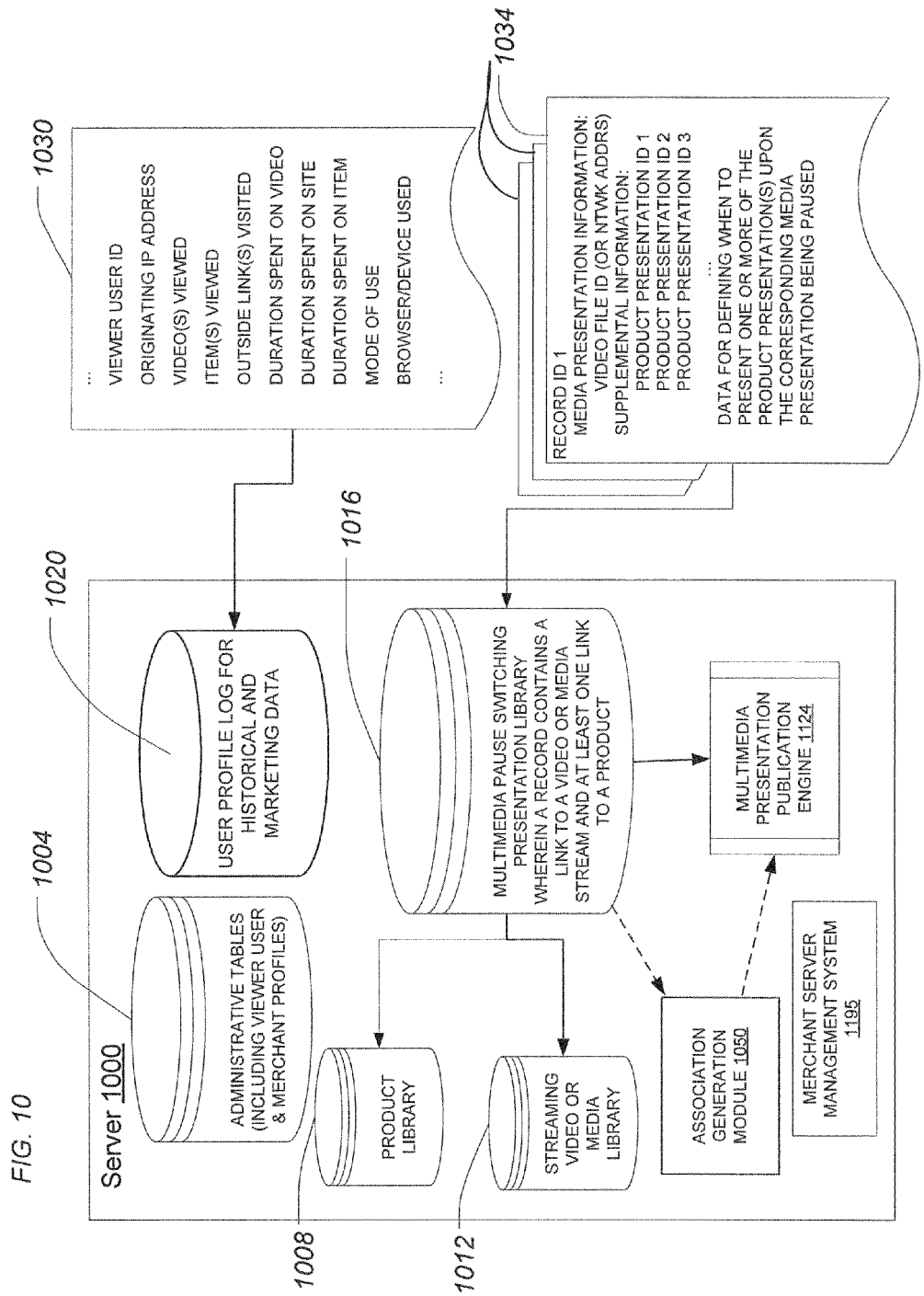
FIG. 10 illustrates one embodiment of the server components for the pause and buy system.

FIG. 10 shows a high level architecture of a server node 1000 for an embodiment of the pause and buy system, wherein this server 1000 provides, e.g., the associations for the pause switching presentations which may be dynamically customized to each user viewer as described further hereinbelow. In particular, server 1000 may be any one of the servers 130, 140 and/or 150 of FIG. 1. Moreover, the, or any of the servers.

The server 1000 includes (or accesses) a number of databases (or portions of a database). Such databases may have a relational, object oriented, hierarchical or other architecture, and each such database has a corresponding database management system as one skilled in the art will understand. Since relational database architectures are most common, a brief discussion regarding relational database technology is provided as follows. Relational database tables may refer to regions of electronic media allocated to contain related data elements or information as in a database table and in a relational model for database management. A database table conceptually is a set of data elements (values) that is preferably organized using a model of vertical columns (which are identified by their name) and horizontal rows. A table preferably has a specified number of columns, but can have any number of rows. Each row is identified by the values appearing in a particular column subset which has been identified as a candidate key. In addition to the actual data rows, tables generally have associated with them some meta-information, such as constraints on the table or on the values within particular columns. The data in a table do not have to be physically stored in the database. Instead, the data for a table can be distributed in a plurality of tables or other databases. Views may be also relational tables, but their data may be calculated at query time.

Referring again to FIG. 10, the administrative tables 1004 may include one or more tables that store data used, for example, for the administration of viewer user data and/or merchant user data related to the pause and buy application. Such information may include, for example: (a) username and password data for merchant users who access the pause and buy system, e.g., for identifying/registering various pause switching presentations, (b) a merchant user's email address, phone number, postal address, security information corresponding to the merchant user's account (e.g., security question, security answer), (c) a merchant's subscription limits (e.g., a limit to the number of pause switching presentations that may be registered with the pause and buy system for presentation to viewer users, (d) a limit to the number of product presentations that may be associated with a corresponding media presentation), (e) a merchant user's permissions (e.g., view, add, edit, delete within the administrative tables 1004), and (f) a merchant user's access area and permissions (as described in FIG. 4B. The tables 1004 may be used to administer viewer user profiles for viewer users who use the pause and buy system. In this regard, the tables 1004 may contain or provided access to: (a) viewer user usernames and passwords, (b) viewer users email addresses, (c) viewer user addresses, (d) viewer user TAG IT data, (e) and/or viewer user keyword preferences, wherein such keyword preferences for a viewer user are used identify additional pause switching presentations which the pause and buy system may notify the viewer user thereof, (f) type and/or version of the media player 114 being used by the viewer user. In one embodiment, a viewer user's keyword preferences may contain one or more keywords that correspond to types of products (e.g., cars, home furnishings, electronics, etc.), and/or types of activities (e.g., hiking, camping, auto racing, etc.), and/or videos that may be of interest to the viewer user.

The administrative tables 1004 may include (or provide access to) data profiling viewer users and/or merchants. Regarding profiles for viewer users, such profiles may be include information that both benefit the viewer users and the merchants supplying pause switching presentations. In addition to viewer user identification (e.g., username and password), corresponding TAG IT data and the keyword preferences data described above, viewer user profiles may include:

(a) data identifying a group of viewer users that share and/or recommend pause switching presentations, e.g., among themselves;

(b) data for classifying the viewer user according to: (i) the pause switching presentations viewed by the viewer user, and/or (ii) the product presentations 270 with which the viewer user interacts. Note that using both types of classification data may provide better profiles for targeting the viewer user for presenting additional pause switching presentations and/or other types of advertising in that each type of classification data may provide information about the viewer user that would not be obtained otherwise. For example, if the pause and buy system receives profile information from a viewer user, wherein the this information indicates that the viewer user views pause switching presentations showing car races, and in addition, the viewer user interacts with product presentations for products such as Viagra®, vitamins, and weight control products, then it might be reasonably inferred that the viewer user would react favorably to a pause switching presentation for speed boat racing that had associated therewith product presentations for a health club with special programs directed to active elderly men. Note that without both types of types of classification, such an inference would be less likely. Indeed if only data regarding viewer user interactions with product presentations were obtained by the pause and buy system (or an affiliate thereof), one might infer an interest in health, but not know what video to associate with health related product presentations that would entice the viewer user to interact with the product presentations. As another example, if the pause and buy system (or an affiliate thereof) received information that a viewer user watched pause switching presentation wherein the corresponding media presentation therefor was an instructional video for surfing, and the viewer user also interacted with an associated product presentation for trips to Southern California, then it might be reasonably inferred that the viewer user would react favorably to a pause switching presentation showing surfing in Hawaii with associated presentations for reduced hotel rates in Hawaii;

(c) data for classifying the viewer user according to the pause presentations recommended to the viewer user by other viewer users;

(d) data for classifying the viewer user according to the pause presentations that the viewer user recommends to another viewer user;

(e) data indicative of the propensity of the viewer user to purchase products from product presentations;

(f) data providing one or more geolocations of the viewer user, e.g., within a particular county, and/or metropolitan area;

(g) locations for obtaining additional viewer user information; e.g., Internet sites www.myspace.com, www.facebook.com, and/or www.linkedin.com; and/or (h) viewer user personal information such as birth date, birthday, age, address, and gender.

The product library 1008 (FIG. 10) may include one or more tables that contain data related to products (as described above for FIGS. 4C and 4D) or presentations 270 that may be displayed and/or referenced by a product panel 250 or an expanded product panel 280 (FIG. 2C). This data may include, for example, (a) product specification information (or a network link/address thereto), (b) product description (or a network link/address thereto), (c) product sizing information (or a network link/address thereto), (d) product purchasing links, (e) links to customer comments for the product, (f) product options such as product colors (or a network link/address thereto), and/or (g) product images (or a network link/address thereto).

In one embodiment of the pause and buy system, the product library 1008 may be used to identify a product that a viewer user has expressed an interest in, but cannot provide sufficient information to identify the product. For example, a viewer user may pause a media presentation 115, and request that the current display of the paused media presentation be transmitted to the pause and buy system (e.g., server 100) for requesting information on a product in the display and/or requesting information on products like one shown in the display. In one embodiment, the viewer user may provide additional information to associate with the image such as: (i) an identification of one or more predetermined classifications of the product, and (ii) text further describing the product. Additionally/alternatively, the viewer user may be provided with the ability to identify the product directly on the image, e.g., via marking up the image by circling the product or providing one or more arrows pointing to the product. Accordingly, once such a viewer user request is received (e.g., by the server 1000), any classifications of the product by the viewer user may be used to identify the likely products, and route the viewer user's request to merchants that provide products in the classifications identified by the viewer user, and if such a merchant has a product fitting the viewer user's request, the merchant can respond to the viewer user with appropriate product information.

The streaming video or media library 1012 of FIG. 10 may include one or more tables that contain data related to streaming video or media files (as described above for FIG. 4E). This data may include for example, (i) a link (e.g., a network address) to each streaming video or media file on the world wide web (or locally if available to the pause and buy system) that has been identified as a corresponding media presentation for a pause switching presentation, (ii) viewing aspect ratios of such streaming video or media files (e.g., 16:9 or 4:3), (iii) the resolution of the corresponding media presentations 115 for such streaming video or media files, (iv) the sample rates of the corresponding media presentations, and optionally (v) descriptions of the contents of the corresponding media presentations 115 presented to the viewer users.

The multimedia pause switching presentation library 1016 may include one or more tables for defining each multimedia pause switching presentation, and in particular, data for identifying each association for such pause switching presentations. Accordingly, for a pause switching presentation, the corresponding association data of the library 1016 identifies:

(a) a streaming video or media file identified in the streaming video or media library 1012, wherein this streaming video or media file results in the corresponding media presentation 115 display for the pause switching presentation;

(b) corresponding supplemental information (or a network address(es) thereto) for presenting the product presentation(s) 270 when the corresponding media presentation 115 is paused; and (c) data for defining conditions for determining when at least one collection of one or more the product presentations 270 is to be presented upon a pause of the corresponding media presentation. As described hereinabove Additionally, such data may also include an ordering of the product presentations 270 to be displayed so that, e.g., at least one of the product presentations more prominent than the other displayed products presentations as shown in FIG. 2B. various ones of. Note that the record 1034 is illustrative of such an association in the product library 1008, wherein this record associates: (i) an identification for a streaming video or media file (or network address thereto) in the library 1012, (ii) one or more records in the product library 1008, and (iii) data for defining the condition(s) when particular ones of the product presentations 270 are to be presented upon a pause of the corresponding media presentation.

The server node 1000 may also access a resource referred to as a user profile log and marketing data 1020, which may include one or more database tables having data that records historical and marketing data, wherein such data can be data mined to produce useful information, for example, to model consumer markets, model consumer preferences, establish target markets, determine efficacy of other factors, and track use for billing purposes. One having ordinary skill in the art will appreciate that in the embodiments presented herein and in any improvements and modifications to the embodiments thereon, the interactions of the viewer user with the widget or gadget 300, the multimedia player 114 and/or the overlay of product presentations 270 may be logged or tracked, for example, for marketing, data mining and cost recovery purposes.

The server 1000 may optionally include an association generation module 1050 for generating associations, e.g., generating such associations for the pause switching presentations when requests for the pause switching presentations are requested. Such associations have been discussed in various passages hereinabove. The high level steps for generating an association for a particular pause switching presentation may be:

(a) Obtain an association template from the library 1016 for the particular pause switching presentation, wherein this template corresponds to the corresponding media presentation for the particular pause switching presentation. More specifically, this template includes an identification of the corresponding media presentation, and may include conditions that relate to, e.g., the content of the corresponding media presentation, order of scene presentation of the corresponding media presentation, and/or timing of video segments within the corresponding media presentation. Accordingly, the template includes identifications of when certain product presentations 270 are to be presented. Note that such templates may be created manually by persons accessing, e.g., the merchant server management system 1195 (described hereinbelow);

(b) Obtain identifying data for the collection(s) of supplemental information for the particular pause switching presentation. The identifying data obtain will define the collection(s) according to, e.g., the viewer user profile in the tables 1004, user viewer information in the viewer user's request for the pause switching presentation, and/or viewer user information in the tables 1020;

(c) For each set of one or more collections of supplemental information whose data is obtained, determine when each collection is to be presented upon pausing the pause switching presentation, and then insert such determinations into a copy of the template that is to become the association to be generated. Such a determination may be straightforward if the data obtained in step (b) above includes display ordering information for the collections wherein this display ordering information is related to, e.g., the order of the presentation of the content of the media presentation (d) Output the copy of the template as the association for the pause switching presentation.

The server node 1000 includes at least one component that communicates with other components and/or nodes through at least one network 1180 (FIG. 11). The multimedia presentation publication engine 1124 may be one such component, wherein this component may be an agent or process for providing details regarding multimedia pause switching presentations to other network components such as the multimedia presentation engine 1164 (FIG. 11 described hereinbelow). In particular, the publication engine 1124 may be invoked by the syndication engine 1164 (described below) of the service broker 1160 to retrieve a pause switching presentation. Alternatively/additionally, the publication engine 1124 may push pause switching presentations to the syndication engine 1164 of the service broker 1160 (also described hereinbelow).

FIG. 11 shows the relationship between various nodes or components in one embodiment of the pause and buy system. The client node 110 contains a multimedia player 114 that presents pause switching presentations to the viewer user. As one having ordinary skill in the art will appreciate, the client node 110 also is equipped with the necessary tools that allow the client node to communicate with the other nodes, including the server node 1000, the service broker node 1160, the merchant server node 1140 and/or the third party vendor server 1150, through at least one network 1180 that may include, for example, a local area network, the Internet 120, a wide area network, a cellular network, a satellite network, a fiber optic network, a telephone system, or combinations thereof. The web server 1190 provides a communication interface for the server node 1000 and the network 1180 including, for example, the login/authentication of viewer users or merchant users on the pause and buy system, acceptance of HTTP requests from the network and service of HTTP requests to the network.

In one embodiment of the present disclosure, the functionality of the service broker node 1160 may be provided by the server node 1000, instead of as a separate standalone node. The interaction between client 110, server node 1000 and service broker 1160 may be characterized as a Web Services system. Web services, provided by such a web services system, are applications that are capable of interoperating with other applications over a communications network, such as a network 1180. Such web services frequently include a web application programming interface (API) that can be accessed over a network and executed on a remote system hosting the requested service. Web services are typically based on standards or protocols such as HTTP, XML, SOAP, WSDL, and UDDI. Methods for providing such web services are well known in the art, and one having ordinary skill in the art will appreciate the implementation of a web service. As shown in FIG. 11, the client 110 invokes the multimedia presentation syndication engine 1164 on the service broker 1160 as a web service. When activated by the client 110 for obtaining a pause switching presentation, the syndication engine 1164 may reference a record 1034 of the multimedia library 1016 to determine how to interact with the multimedia player 114; the syndication engine 1164 may directly serve the pause switching presentation to the client node 110 for presentation on the multimedia player 114. Additionally/alternatively, the syndication engine 1164 may instruct the multimedia player 114 to retrieve certain data from a merchant server 1140 related to product presentation (database) 1144 and/or streaming media (database) 1148, wherein corresponding items from each of these databases are used to provide a pause switching presentation having these items to the client node 110. Thus, in one embodiment the engine 1164 may provide the multimedia player 114 with data providing the association data for a pause switching presentation, and the actual corresponding media presentation and supplemental information is obtained from, e.g., the merchant server 1140.

In one embodiment, the syndication engine 1164 may instruct the multimedia player 114 to contact a third party vendor server 1150 for the multimedia pause switching presentation.

The syndication engine 1164 may be also in communication with a logging module 1168 that may reside on the service broker 1160 or remotely on the server node 1000. As one having ordinary skill in the art will appreciate, the logging module 1168 may be invoked by the multimedia presentation syndication engine 1164 and/or by the multimedia player 114 to record data in the user profile log 1020 of the server node 1000. When invoked, the syndication engine 1164 may also directly communicate with components of the server node 1000 such as, for example, the user profile log 1020 to create, read, update or delete user-specific data and TAG IT data. One having ordinary skill in the art will appreciate that the server 1000, web server 1190, service broker 1160 and client 110 are conceptual elements that may exist on a single machine, or be distributed among multiple systems. Additionally, one having ordinary skill in the art will appreciate that the corresponding elements within the server 1000, web server 1190, service broker 1160 and client 110 may further be consolidated or distributed among multiple systems. As used herein, the term "node" refers only to the respective conceptual elements, and not to a physical termination point or system.

FIG. 12 is a flowchart illustrating the steps that may be performed in one embodiment of the pause and buy system. The process begins at 1202 where the syndication engine 1164 on the service broker 1160 is in a wait state. The viewer user at the client node 110 then interacts with the graphical interface 112 and requests to view, listen to or interact with, a multimedia pause switching presentation at step 1204. This interaction includes a request in step 1208 from the client node 110 to the syndication engine 1164, which may occur, for example, by HTTP request, XML message request, remote procedure call or remote method invocation. Upon receiving the request (e.g., or message depending on the architecture), the syndication engine 1164, in step 1210, sends at least the corresponding media presentation (e.g., the corresponding video) for the requested multimedia pause switching presentation to the client node 110. Alternatively, in another embodiment, the syndication engine 1164 may instead send a network address and instructions for the multimedia player 114 to obtain the corresponding media presentation from elsewhere, e.g., the merchant server 1140. In one embodiment, the syndication engine 1164 may push (without receiving a request) the corresponding media presentation (or the entire multimedia pause switching presentation) out to a client node 110 which may be, for example, a public kiosk, a public computer, or even a viewer user's desktop. Once the multimedia player 114, in step 1211, retrieves the corresponding media presentation for the multimedia pause switching presentation that was retrieved from the syndication engine 1164, step 1212 is performed, wherein the multimedia player 114 plays the corresponding media presentation (labeled 115 in FIGS. 2A-2C) to the viewer user. The corresponding media presentation 115 may be locally cached on the viewer user's computer system 110 or on another device, wherein the cached data may also include the overlay supplemental information of the product presentations for to the requested multimedia pause switching presentation.

In step 1216, the multimedia player 114 detects a termination or pause of the media presentation 115. Termination of the media presentation 115 as used herein means, for example, viewer user selection to terminate play, completion of the media presentation 115, or closure of the media player 114. Upon termination, the process of FIG. 12 returns to the wait state of step 1202. In one embodiment of the present disclosure, activation of the pause function (e.g., provided by the play/pause buttons 210 and 584, respectively, in FIGS. 2A and 5) may include, for example, the viewer user: (a) selecting an actual pause button, (b) selecting, by a user click or tap, any location on the multimedia player 114 area that is not associated with a specific control, (c) selecting a portion of the web browser 112 outside the multimedia player 114 (e.g., shifting focus off of the multimedia player), or (d) selecting a button designated to invoke pause of the media.

In the decision step 1218, a determination is made as to whether the media presentation 115 is terminated, or the pause and buy button 230 (e.g., FIGS. 2A-2C) has been activated. If it is determined that the media presentation 115 has terminated or the viewer user has selected a termination of the media presentation, then the process of FIG. 12 returns to the start of the present flowchart. If, on the other hand, it is determined that the pause and buy button/control 230 (or 588, FIG. 5) is activated, then step 1220 is performed. In step 1220, the following tasks are performed: (a) the media presentation 115 is paused, (b) the frame or time sequence of the paused media presentation 115 is saved, and (c) supplemental information related to media presentation 115 is presented. More precisely, a product panel 250 is presented having product presentations displayed therein. In general, it is desirable for product presentations to relate to the content, items, techniques or services identified in the paused media presentation 115. However, this is not mandatory or required. For some multimedia pause switching presentations, the corresponding presentation, the corresponding supplemental information may not identify a product herein. For example, a media presentation 115 may be a video of an African safari, and the corresponding product presentations may be advertisements for vacations to Africa or a resort in Africa which is not identified or shown in the media presentation 115.

The presenting of supplemental information is described in more detail in the pause and buy process 1300 of FIG. 13. In one embodiment, the supplemental information presented in the pause and buy process 1300 may use additional information in addition to or instead of the content (e.g., items/products, techniques and/or services identified or shown) in the corresponding media presentation 115. For example, other factors that may be used (instead or in addition to the media presentation 115 content) to identify items/products, techniques and/or services to be presented in the supplemental information include: (a) the viewer user's geographical location, (b) the network communication method (e.g., computer network, cellular network), (c) the type or version of multimedia player 114, (d) the viewer user's keyword preferences, and/or (e) viewer user profile information stored in the administrative tables 1004 (FIG. 10). Additionally, the supplemental information may be determined according to promotions, product inventories, random product presentation, and/or the viewer user's profile on, e.g., the server 1000. Accordingly, the supplemental information associated with the media presentation 115 of a multimedia pause switching presentation may be such that the product presentations 270 of the supplemental information are dynamically loaded on the client node 110 from a network site (e.g., server 130, 140, 150, 1000, 1140, 1150 or the service broker 1160) in a separate network transmission from the corresponding media presentation. Accordingly, the association data for the pause switching presentation may include network addresses for obtaining the product presentations 270 according to viewer user specific criteria and/or merchant specific criteria, and such network addresses (or their product presentation target data) can be varied according to such viewer user or merchant specific criteria.

The dynamic customization of the product presentations 270 for a pause switching presentation according to viewer user and/or merchant specific criteria may be an important aspect of some embodiments of the pause and buy system since this allows both better targeting of product presentations 270 to receptive viewer users, and provides substantial flexibility to the merchants in presenting various versions of their products to the viewer users. Note that there are numerous techniques for transmitting the three major portions of a multimedia pause switching presentation to viewer users, and some have been described above. However, for greater clarity, such techniques are further listed as follows:

(a) An entire multimedia pause switching presentation may be downloaded to a viewer user during a single network 1180 transmission (e.g., from the service broker 1160). In this case, the dynamic customization of the pause switching presentation occurs prior to the network transmission, and may require dynamically generating data defining the association using information in the viewer user's request, in the administrative tables 1004, and the library 1016. In particular. Note that since the viewer user can be identified from user identification information provided with such a request, the administration tables 1004 (FIG. 10) and/or the user profile log 1020 (FIGS. 10 and 11) may be accessed for determining likely interests of the viewer user given the user identification. Accordingly, such dynamic customization of the pause switching presentation may be the result of an association being generated by the association generation module 1050 described hereinabove.

(b) The media presentation and it's association may be downloaded (from the same or different servers) to the viewer user's client node 110 followed by the supplemental information when the first pause of the pause switching presentation occurs (i.e., the first activation of the button 230).

(c) The media presentation may be downloaded data to the viewer user's client node 110 followed by the supplemental information and the corresponding association (from the same or different servers) when the first pause of the pause switching presentation occurs (i.e., the first activation of the button 230).

FIG. 13 is a flowchart illustrating one embodiment of the steps performed in the pause and buy process 1300 for presenting a pause switching presentation. The process 1300 begins at step 1304 by determining at least one of, e.g., the frame, time sequence or other relative or absolute spatial identifier of the media presentation 115 being presented at the client node 110. In step 1308, the multimedia player 114 in the client node 110 issues a request to the syndication engine 1164 to retrieve supplemental information that corresponds to the multimedia pause switching presentation being presented. Alternatively, the multimedia player 114 may have the instructions or information necessary to obtain the supplemental information that corresponds to the pause switching presentation, based on information already known. In this alternative, the multimedia player may retrieve or issue a request directly to, e.g., the merchant server 1140 or third party vendor server 1150 to obtain the supplemental information for presentation as an overlay, or a product panel 250 or 600. As described above, the overlay data may correspond specifically to the frame, time sequence or other relative or absolute spatial identifier of the media presentation 115. In step 1312, the overlay data associated with the media presentation (or the current display thereof) is presented on the client node 110 as, for example, the product panels 250 and 600 in FIGS. 2B and 6. In step 1316, a determination is made as to whether: (a) a request by the viewer user was made for additional information about an item, procedure or service displayed in a product presentation 270 in the overlay; (b) a request by the viewer user was made to return to the paused media presentation 115; or (c) a request by the viewer user was made to activate overlay controls for presenting additional or alternative information related to an item, procedure or service displayed in a product presentation 270 of the overlay. One having ordinary skill in the art will appreciate that requests include selecting control features of an overlay, multimedia player 114 or other application, control features including, for example, scroll bars, tabbed displays, drop down menus, and radio buttons.

If it is determined that the viewer user has selected the control to request additional information about an item, procedure or service displayed in a product presentation 270, the multimedia player 114 may retrieve from the network 1180, in step 1320, additional information corresponding to the item, procedure or service selected by the viewer user. In step 1320, the multimedia player 114 in the client node 110 retrieves or issues a request to, e.g., the syndication engine 1164 for additional information that corresponds to the item, procedure or service displayed in the overlay and subsequently selected by the viewer user. Alternatively, the multimedia player 114 may, based on the multimedia pause switching presentation information downloaded, retrieve or issue a request directly to a merchant server 1140 or third party vendor server 1150 to obtain the additional information. The determination is then made at step 1330 whether the retrieved data is to be presented within the existing overlay (i.e., to replace the existing overlay content as, for example, the expanded product panels 280 and 700 in FIGS. 2C and 7). If so, then the process returns to step 1312, where the retrieved data is presented at the client node 110 for presentation in an existing overlay. If, on the other hand, the retrieved data is not to be presented within the existing overlay, the existing overlay may, in some embodiments, be removed in step 1332, and the retrieved data is presented otherwise by the multimedia player 114, e.g., an additional overlay may be presented, or a new interface window may be instanced (e.g., a pop up window), or an additional instance of a multimedia player 114 may be spawned. The process then returns to step 1316.

If it is determined that the viewer user has made the selection, in step 1340, of a control to close the overlay, or otherwise resume the corresponding media presentation, the overlay is removed in step 1344. In step 1348, if a previous or underlying overlay does not exist for presentment, then the pause and buy process 1300 ends at step 1352. If, however, a previous or underlying overlay does exist for presentment, then the previous overlay data is presented to the client node 110 and the process returns to step 1316.

If it is determined that the viewer user has made the selection, in step 1360, of navigation controls related to the overlay or to items contained therein (e.g., similar to the controls 260, 604 and 608 in FIGS. 2B and 6), then in step 1364, the multimedia player 114 in the client node 110 optionally retrieves from the syndication engine 1164, the merchant server 1140 or a third party vendor server 1150, the additional information that corresponds to the data related to the item, procedure or service that corresponds to the viewer user's selection. In an alternative embodiment of the present disclosure, the data related to the item, procedure or service may, for example, exist locally or have been previously buffered at the client node 110. The additional information is then presented on the client node 110 in step 1368 as, for example, a product panel 250 and 600 in FIGS. 2B and 6.

"Pause & Brief"

In yet another embodiment of the present disclosure, the supplemental information that is presented (as, e.g., overlay data) may not be advertisement or other promotional information, but instead be documents or other interactive media or interfaces including, for example, a word processing document, a spreadsheet, a presentation, in a portable document format or other data file. Moreover, a viewer users may be able to open, edit and/or view data in such documents during the presentation of the corresponding media presentation.

"Video-in-Video"

In yet another embodiment of the present disclosure, the supplemental information that is presented may include supplemental media (video or audio) data streams. In this embodiment, a viewer user may be able to select the pause and buy process 1300 and access vignettes that branch from the primary pause switching presentation to see/hear various supplemental presentations.

"Gaming"

In another embodiment of the present disclosure, the pause and buy system may be implemented in a gaming application. In such an embodiment, the game may be paused or suspended, and supplemental information may be presented to the viewer user, e.g., as overlay data, that allows the viewer user to, for example, use the gaming controls or other user interface controls to navigate or perform selections of, e.g., advertising. The above embodiment may be implemented in a game setting wherein there exist product placement or advertisements within the game sequences or graphics, and a pause of the game provides additional advertising information regarding, e.g., a current scene of the game.

In yet another embodiment of the pause and buy system, the system may be implemented as part of a role playing game or virtual world application. In such an embodiment, the game may not need to be paused or suspended for an overlay to be presented to the viewer user. The overlay may be presented when the game character approaches or interacts with a product placement or advertisement within the gaming sequence or graphics; or when the game character enters a particular region of the playing area; or when the viewer user selects a control or sequence of controls. In this embodiment, the viewer user may, for example, interact directly with overlay display of the supplemental information (e.g., an overlay) as in other embodiments, or the viewer user may use the game character to indirectly interact with the overlay (e.g., as in virtual world of Second Life®).

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The one or more present inventions, in various embodiments, include components, methods, processes, systems and/or apparatus substantially as depicted and described herein, including various embodiments, subcombinations, and subsets thereof. Those having ordinary skill in the art will understand how to make and use the present invention after understanding the present disclosure.

The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method providing advertising to a first node via a network, comprising:
   providing an advertiser with access to a management system for inputting data for identifying a commercial of a predetermined time length, wherein the commercial comprises video media presentation data;
   receiving a selection request from a web browser at the first node via the network for the commercial of the predetermined time length, wherein the selection request for the commercial is responsive to a web browser selection of the commercial at the first node;
   transmitting the requested commercial of the predetermined time length via the network to the first node in response to the web browser selection request, wherein there is supplemental information having a predetermined association with the video media presentation data of the requested commercial;
   transmitting the supplemental information associated with the requested commercial, via the network, to the first node; and
   wherein when a presentation of the video media presentation data of the requested commercial is paused at the first node, the supplemental information is presented at the first node overlain on a minority region of the paused presentation of the requested commercial so that a majority region of the paused presentation of the requested commercial is still viewable along with overlain presentation of the supplemental information, wherein the supplemental information comprises a plurality of selectable overlay advertising thumbnail images in a sequential array arrangement and depicting products or services that are related to the contents of the presentation of the requested commercial;
   wherein there is respective additional supplemental information presented at the first node comprising respective enlarged depictions of each of the plurality of selectable overlay advertising thumbnail images, when each of the plurality of selectable overlay advertising thumbnail images is selected;
   wherein information indicative of the pause of the requested commercial occurring at the first node is received via the network at a predetermined network node; and
   wherein when presentation of the video media presentation data is unpaused at the first node for continuation of the presentation of the requested commercial, the continuation proceeds at a portion of the presentation of the requested commercial that is relative to a portion of the presentation where the pause of the requested commercial occurred.

2. The method of claim 1, wherein transmitting the requested commercial comprising the video media presentation data occurs as a consequence of a web server receiving the request for transmitting the requested commercial comprising the video media presentation data.

3. The method of claim 1, wherein the transmitting of the supplemental information occurs as a consequence of the request for the commercial.

4. The method of claim 1, wherein the information indicative of the pause of the requested commercial includes at least one of: first identification data for identifying the first node, second identification data for identifying the video media presentation data, third identification data for identifying one or more advertising presentations presented at the node in response to the pause of the requested commercial.

5. The method of claim 1, further including receiving at the predetermined network node, via a transmission on the network, data indicative of the presentation of the video media presentation data of the requested commercial occurring at the node.

6. The method of claim 5 further including determining an additional video media presentation data, wherein the additional video media presentation data is determined using a data related to a contents of the video media presentation data of the requested commercial.

7. The method of claim 6 further including transmitting the additional video media presentation data to the first node via the network.

8. The method of claim 1 further including the steps of:
   inputting data via the management system for identifying one or more advertisements of the supplemental information, and creating the predetermined association; and
   receiving, once the predetermined association is created, a transmission on the network from the advertiser, wherein the transmission identifies at least one of: the video media presentation data of the requested commercial, the supplemental information, and the predetermined association.

9. The method of claim 1, wherein during the presentation by a media player at the first node, the media player: (a) pauses the presentation of the media presentation data upon detection of the pause, (b) presents one or more advertising presentations comprising the plurality of selectable overlay advertising thumbnail images, (c) receives selections when each of the plurality of selectable overlay advertising thumbnail images is selected, (d) enlarges respective depictions of each of the plurality of selectable overlay advertising thumbnail images, when each of the plurality of selectable overlay advertising thumbnail images is selected, and e) changes respective additional presentation characteristics of each of the plurality of selectable overlay advertising thumbnail images, when each of the plurality of selectable overlay advertising thumbnail images is selected.

10. The method of claim 9, wherein the respective additional presentation characteristics comprise respective purchase information for each product or service shown in the requested commercial of the predetermined time length.

11. The method of claim 9, wherein the changes to respective additional presentation characteristics comprise configuring each of the advertising presentations to accept input for requesting additional advertising information.

12. The method of claim 9, wherein the respective additional presentation characteristics comprise respective reviews for each product or service shown in the requested commercial of the predetermined time length.

13. The method of claim 1, wherein upon continuation of the presentation of the requested commercial, a change to a presentation for the supplemental information occurs, wherein the change includes one of: reducing a size of the presentation for the supplemental information, configuring the presentation for the supplemental information to cease to accept input for requesting additional advertising information, and terminating the presentation for the supplemental information.

14. The method of claim 1, wherein the continuation of the presentation of the requested commercial continues from one of: where the pause occurred, and from a portion of the presentation presented earlier than when the pause occurred.

15. The method of claim 1, wherein selection of a location on the presentation of the requested commercial comprising the video media presentation data is used to select at least one advertising presentation for the supplemental information.

16. The method of claim 1, wherein scrollable presentation movement is selectable to shift the sequential array arrangement of the plurality of selectable overlay advertising thumbnail images.

17. The method of claim 1, wherein the sequential array arrangement of the plurality of selectable overlay advertising thumbnail images comprises primary and secondary presentation spaces, wherein the primary presentation space appears in a center position of the sequential array, and the secondary presentation space appears in less central positions of the sequential array, and wherein one of the overlay advertising thumbnail images is arranged in the center position and is depicted larger than depictions of remaining ones of the selectable overlay advertising thumbnail images.

18. The method of claim 1, further including determining the supplemental information according to profile information; and associating the supplemental information with the multimedia presentation prior to transmitting at least one of the multimedia presentation data and the supplemental information.

\* \* \* \* \*